United States Patent
Jou et al.

(10) Patent No.: US 11,704,319 B1
(45) Date of Patent: Jul. 18, 2023

(54) TABLE CALCULATIONS FOR VISUAL ANALYTICS USING CONCISE LEVEL OF DETAIL SEMANTICS

(71) Applicant: Tableau Software, LLC, Seattle, WA (US)

(72) Inventors: Alvin Edward Jou, Seattle, WA (US); Bethany Meaghan Lyons, London (GB); Jeffrey Mark Booth, Jr., Seattle, WA (US)

(73) Assignee: Tableau Software, LLC, Seattle, WA (US)

( * ) Notice: Subject to any disclaimer, the term of this patent is extended or adjusted under 35 U.S.C. 154(b) by 0 days.

(21) Appl. No.: 17/501,928

(22) Filed: Oct. 14, 2021

(51) Int. Cl.
G06F 16/2455 (2019.01)
G06F 16/248 (2019.01)
G06F 16/2452 (2019.01)

(52) U.S. Cl.
CPC ...... G06F 16/24554 (2019.01); G06F 16/248 (2019.01); G06F 16/2452 (2019.01)

(58) Field of Classification Search
None
See application file for complete search history.

(56) References Cited

U.S. PATENT DOCUMENTS

| | | | |
|---|---|---|---|
| 7,801,885 B1 * | 9/2010 | Verma | G06F 16/9535 707/758 |
| 8,306,971 B2 | 11/2012 | Stolte et al. | |
| 9,405,823 B2 * | 8/2016 | Mamou | G06F 16/3343 |
| 9,501,585 B1 | 11/2016 | Gautam et al. | |
| 9,665,662 B1 | 5/2017 | Gautam et al. | |
| 10,515,121 B1 | 12/2019 | Setlur et al. | |
| 10,698,977 B1 * | 6/2020 | Zhang | G06F 40/117 |
| 11,055,489 B2 | 7/2021 | Djalali et al. | |
| 11,294,924 B1 * | 4/2022 | Talbot | G06F 3/04842 |
| 2002/0059204 A1 | 5/2002 | Harris | |
| 2010/0299367 A1 * | 11/2010 | Chakrabarti | G06F 16/24578 707/769 |
| 2011/0112837 A1 | 5/2011 | Kurki-Sounio et al. | |
| 2014/0236579 A1 | 8/2014 | Kurz | |
| 2015/0213126 A1 * | 7/2015 | Yishay | G06F 16/334 707/722 |

(Continued)

OTHER PUBLICATIONS

Cimiano, Philipp, et al. "Towards portable natural language interfaces to knowledge bases-the case of the ORAKEL system." Data & Knowledge Engineering 65.2, Nov. 2007, pp. 325-354. (Year: 2007).

(Continued)

*Primary Examiner* — Kim T Nguyen
(74) *Attorney, Agent, or Firm* — Morgan, Lewis & Bockius LLP

(57) ABSTRACT

A computing device receives user selection of a data source. The computing device receives a user input to specify a level of detail (LOD) expression, which includes a first keyword, a SORT keyword, and an analytic expression. In response to the user input, the computing device identifies one or more data fields from the data source. The device translates the LOD expression into one or more executable database queries referencing the identified data fields. The computing device executes the queries to retrieve data from the data source. The computing device generates and displays a data visualization using the retrieved data.

20 Claims, 36 Drawing Sheets

(56) References Cited

U.S. PATENT DOCUMENTS

| | | | | |
|---|---|---|---|---|
| 2015/0317355 | A1* | 11/2015 | Schimmelpfeng | G06F 16/951 707/722 |
| 2016/0019304 | A1* | 1/2016 | Kim | G06F 16/338 707/722 |
| 2016/0048561 | A1* | 2/2016 | Jones | G06F 16/285 707/722 |
| 2016/0132608 | A1* | 5/2016 | Rathod | H04W 4/21 707/722 |
| 2016/0171100 | A1* | 6/2016 | Fujita | G10L 15/10 707/722 |
| 2016/0188718 | A1* | 6/2016 | Inoue | G06F 16/3331 707/706 |
| 2017/0109377 | A1* | 4/2017 | Baer | G06F 16/9535 |
| 2018/0032576 | A1 | 2/2018 | Romero | |
| 2018/0144065 | A1 | 5/2018 | Yellali | |
| 2019/0018839 | A1 | 1/2019 | Ge et al. | |
| 2019/0026318 | A1 | 1/2019 | Bertellotti et al. | |
| 2019/0138648 | A1 | 5/2019 | Gupta et al. | |
| 2020/0065385 | A1 | 2/2020 | Dreher et al. | |
| 2020/0110803 | A1 | 4/2020 | Djalali et al. | |
| 2021/0319186 | A1 | 10/2021 | Djalali et al. | |
| 2022/0004556 | A1* | 1/2022 | Arnold | G06F 16/242 |
| 2022/0300525 | A1* | 9/2022 | Talbot | G06F 16/213 |

OTHER PUBLICATIONS

Djalali, Preinterview First Office Action, U.S. Appl. No. 16/166,125, dated May 5, 2020, 19 pgs.

Djalali, First Action Interview Office Action, U.S. Appl. No. 16/166,125, dated Sep. 9, 2020, 20 pgs.

Djalali, Quayle Office Action, U.S. Appl. No. 16/166,125, Mar. 3, 2021, 8 pgs.

Djalali Notice-of-Allowance, U.S. Appl. No. 16/166,125, dated 17, 2021, 7 pgs.

Gao, Tong, et al. "Datatone: Managing ambiguity in natural language interfaces for data visualization." Proceedings of the 28th Annual ACM Symposium on User Interface Software & Technology. Nov. 2015, pp. 489-500. (Year: 2015).

Matsushita, Mitsunori, Eisaku Maeda, and Tsuneaki Kato. "An interactive visualization method of numerical data based on natural language requirements." International journal of human-computer studies 60.4, Apr. 2004, pp. 469-488. (Year: 2004).

Popescu, et al. "Towards a theory of natural language interfaces to databases." Proceedings of the 8th international conference on Intelligent user interfaces. Jan. 2003, pp. 149-157. (Year: 2003).

Sang Yun et al: "A phrase-driven grammar system for interactive data visualization," Proceedings of SPIE, vol. 6809, Jan. 27, 2008, p. 68090k, XP055650259, 1000 20th St. Bellingham WA 98225-6705 USA, ISBN: 978-1-5106-2687-4, 13 pgs.

Stolte et al., "Polaris: a system for query, analysis, and visualization of multidimensional relational databases," IEEE Transactions on Visualization and Computer Graphics 8, No. 1 (2002): 52-65-, (Year: 2002).

Tableau Software, Inc., International Search Report and Written Opinion, PCT/US2019/055169, dated Dec. 16, 2019, 12 pgs.

Tresor Mvumbi: "Natural Language Interface to Relational Database: a Simplified Customization Approach," Dissertation presented for the Degree of Master of Science in the Department of Computer Science, Aug. 2016, XP055650275, retrieved from htttps://open.uct.ac.za/bitstream/handle/11427/23058/thesis_sci_2016_mvumbi_tresor.pdf?sequece=1&iAllowed=y.

Vidya Setluer et al: "Eviza" User Interface Software and Technology, ACM, 2 Penn Plaza, Suite 701 New Yourk NY 10121-0701 USA, Oct. 16, 2016, pp. 365-377, XP058299767, DOI: 10.1145/2984511.2984588, ISBN: 978-1-4503-4189-9, 13 pgs.

Djalali, Office Action, U.S. Appl. No. 17/359,387, dated Oct. 20, 2022, 16 pgs.

Djalali, Notice of Allowance, U.S. Appl. No. 17/359,387, dated Feb. 13, 2023, 8 pgs.

Nhan, Office Action, U.S. Appl. No. 17/095,696, dated Jul. 8, 2021, 13 pgs.

Nhan, Notice of Allowance, U.S. Appl. No. 17/095,696, dated Apr. 20, 2022, 8 pgs.

Nhan, Notice of Allowance, U.S. Appl. No. 17/887,361, dated Dec. 14, 2022, 7 pgs.

Sleeper, Ryan (Practical Tableau, https://learning.oreilly.com/library/view/practical-tableau/9781491977309/, Apr. 2018) (Year: 2018).

* cited by examiner

{keyword [dimension1],[dimension2]... : aggregate expression}
         └──────────────┬─────────────┘  └────────┬────────┘
                       412                       414
 410

510 → 512 ↓ 514 ↓ 516 ↓

| Customer | Order ID | Sales |
|---|---|---|
| Helen | 1 | 15 |
| Bethany | 2 | 10 |
| Helen | 3 | 25 |
| Bethany | 4 | 20 |

518-1 → Helen row; 518-2 → Bethany row; 518-3 → Helen row; 518-4 → Bethany row

| Customer | Sales |
|---|---|
| Helen | 40 |
| Bethany | 30 |

524-1 → Helen; 524-2 → Bethany

```
SELECT Customer, SUM(Sales) AS Sales
FROM Orders
GROUP BY Customer
```

| Customer | Order ID | Sales | Running Sum | Customer Running Sum |
|---|---|---|---|---|
| Helen | 1 | 15 | 15 | 15 |
| Bethany | 2 | 10 | 25 | 10 |
| Helen | 3 | 25 | 50 | 40 |
| Bethany | 4 | 20 | 70 | 30 |

512 → Customer, 514 → Order ID, 516 → Sales, 542 → Running Sum, 544 → Customer Running Sum 518-1, 518-2, 518-3, 518-4

```
SELECT *, SUM(Sales) OVER ( ORDER BY [Order ID] ) AS [Running Sum],
SUM(Sales) OVER(PARTITION BY Customer ORDER BY [Order ID] ) AS [Customer Running Sum]
FROM Orders
```

```
{INCLUDE [Customer] SORT [Order ID]: RUNNING_SUM(SUM(Sales))}
```

```
SELECT SUM(Sales) OVER( PARTITION BY [Viz Dimension 1]...,
[Viz Dimension N] ,[Customer] ORDER BY [Order ID]) AS [Running
Sum]
FROM(
    SELECT [Viz Dimension 1]...,[Viz Dimension N],[Customer],
    [Order ID], SUM(Sales) AS Sales
    FROM [Line Items]
    GROUP BY [Viz Dimension 1]...,[Viz Dimension N],
    [Customer],[Order ID]
) RunSum
```

```
SELECT RANK() OVER(PARTITION BY [Customer] ORDER BY [Order ID]
) AS [Rank]
FROM [Line Items]
GROUP BY [Customer], [Order ID]
```

```
{FIXED [Customer] SORT [Order ID]: RANK()}
```

Figure 5N

```
SELECT RANK() OVER(PARTITION BY [Customer] ORDER BY SUM(Sales) ) AS [Rank]
FROM [Line Items]
GROUP BY [Customer], [Order ID]
```

```
{FIXED [Customer] SORT [Order ID] BY SUM(Sales) : RANK()}
```

| Customer | Order ID | SUM(Sales) | Orders Ranked | Orders Ranked by SUM(Sales) |
|---|---|---|---|---|
| Helen | 1 | 15 | 1 | 2 |
| Bethany | 2 | 10 | 1 | 2 |
| Helen | 3 | 25 | 2 | 1 |
| Bethany | 4 | 20 | 2 | 1 |

(B)

The LOD expression has the format: {Keyword1 [Fieldlist1] SORT [Fieldlist2] BY AGG(Field3) : analytic_expression()}. — 776 keyword1 is the first keyword. — 778

[Fieldlist1] is the dimensionality expression and is a list of one or more ordering data fields. — 780

[Fieldlist2] is a list of one or more dimension data fields. — 782

(Field 3) is the measure data field. — 784

AGG is an aggregation operator corresponding to the aggregation operation. — 786

The aggregation operator is one of: SUM, AVG, COUNT, COUNTD, MIN, and MAX. — 788

The LOD expression further includes a sort direction keyword following (Field 3). — 790

(Field3) is a single measure data field. — 792

Translating the LOD expression into one or more executable database queries includes translating the LOD expression into a second query that includes an ORDER BY operator, which arranges data rows in an order according to the measure data field and a GROUP BY operator, which partitions the data rows according to the list of ordering data fields. — 794

TABLE CALCULATIONS FOR VISUAL ANALYTICS USING CONCISE LEVEL OF DETAIL SEMANTICS

RELATED APPLICATIONS

This application is related to the following applications, each of which is incorporated by reference herein in its entirety:

(i) U.S. patent application Ser. No. 14/801,750, filed Jul. 16, 2015, entitled "Systems and Methods for using Multiple Aggregation Levels in a Single Data Visualization";

(ii) U.S. patent application Ser. No. 16/846,183, filed Apr. 10, 2020, entitled "User Interface for Generating Data Visualizations that Use Table Calculations"; and (iii) U.S. patent application Ser. No. 17/095,696, filed Nov. 11, 2020, entitled "Methods and User Interfaces for Generating Level of Detail Calculations for Data Visualization."

TECHNICAL FIELD

The disclosed implementations relate generally to data visualization and more specifically to systems, methods, and user interfaces for interactive visual analysis of a data set.

BACKGROUND

Data visualization applications enable a user to understand a data set visually. Visual analyses of data sets, including distribution, trends, outliers, and other factors are important to making business decisions. Some data sets are very large or complex, and include many data fields. Some data elements are computed based on data from a selected data set. Various tools can be used to help understand and analyze the data, including dashboards that have multiple data visualizations and natural language interfaces that help with visual analytical tasks. Some data visualization applications enable a user to specify a "Level of Detail" (LOD), which can be used for aggregate calculations. In particular, LOD expressions are a powerful tool to aggregate data at different levels.

SUMMARY

There is a need for improved systems and methods that support interactions with visual analytical systems. The present disclosure describes systems, methods, and devices for generating data visualizations using Level of Detail (LOD) expressions that support analytic functions.

LOD expressions allow a user to compute values at the data source level and the visualization level. LOD expressions can provide control on the level of granularity for computations. For example, LOD expressions can be performed at a more granular level (INCLUDE), a less granular level (EXCLUDE), or an entirely independent level (FIXED) Some implementations enable users to specify, create, and/or modify such LOD expressions, via intuitive graphical user interfaces.

Aggregate functions and analytic functions are two major function types that support data visualization. An aggregate function returns a single result for a group of rows. An analytic function computes values over a group of rows and returns a single result for each row. Typical aggregate functions are Sum, Count, and Average.

According to some aspects of the present disclosure, one or more keywords are introduced to LOD expressions to enable LOD expressions to support analytic functions (e.g., Rank, Running Sum, and Lookup) for visual analysis.

Generating data visualizations often involves computing data at multiple different levels of detail. According to some aspects of the present disclosure, a computing device running a data visualization application with a graphical user interface can generate multi-step calculations at different levels of detail. The computing device (e.g., via the data visualization application) enables users to incrementally build multi-pass aggregations through data visualizations. The computing device generates LOD expressions (e.g., LOD calculations), which are then used in the data visualizations.

In accordance with some implementations, a method is performed at a computing device. The computing device includes a display, one or more processors, and memory. The memory stores one or more programs configured for execution by the one or more processors. The computing device receives user specification of a data source. The computing device receives a user input to specify a level of detail (LOD) expression. The LOD expression includes a first keyword, a SORT keyword, and an analytic expression. The first keyword specifies how a dimensionality expression corresponding to the first keyword is used in the LOD expression. The analytic expression includes an analytic function that partitions data rows from the data source into groups and computes a respective distinct value for each row in a respective group using values from other rows in the respective group. In response to the user input, the computing device identifies one or more data fields from the data source. The computing device translates the LOD expression into one or more executable database queries referencing the identified data fields. The computing device executes the one or more queries to retrieve data from the data source. The computing device generates and displays a data visualization using the retrieved data.

In some implementations, the first keyword is FIXED, INCLUDE, or EXCLUDE.

In some implementations, the analytic function is RUNNING_SUM, RUNNING_AVERAGE, RUNNING_COUNT, RUNNING_MAX, RUNNING_MIN, RANK, RANK_DENSE, RANK_MODIFIED, RANK_PERCENTILE, RANK_UNIQUE, or LOOKUP.

In some implementations, the identified data fields include an ordering field corresponding to the SORT keyword. Executing the one or more queries includes executing a sort operation to order data rows of the data source according to the ordering field. In some implementations, the ordering field is a dimension data field.

In some implementations, the data source comprises a data table that includes a plurality of data rows. Executing the one or more queries includes computing values over a subset of the data rows and returning a single result for each data row in the subset.

In some implementations, the LOD expression has the format {Keyword1 [Fieldlist1] SORT [Fieldlist2] : analytic_expression()}. keyword1 is the first keyword. [Fieldlist1] is the dimensionality expression and comprises a list of one or more dimension data fields. [Fieldlist2] is a list of one or more dimension data fields. In some implementations, [Fieldlist2] includes a first dimension data field with a first sort direction. [Fieldlist2] also includes a second dimension data field having a second sort direction that is distinct from the first sort direction. Executing the one or more queries includes executing a first sort operation with the first sort direction to order data rows of the data source according to the first dimension data field. Executing the one or more queries also includes executing a second sort operation with the second sort direction to order data rows of the data source according to the second dimension data field. In some implementations, the LOD expression further includes a sort direction keyword.

In some implementations, translating the LOD expression into one or more executable database queries includes translating the LOD expression into a first query having an ORDER BY operator, which arranges data rows in an order according to [Fieldlist2].

In some implementations, the data source is a data table that has a plurality of data rows. The LOD expression further includes a BY keyword that specifies an aggregation operation on a measure data field of the data source, aggregates corresponding values of the measure data field according to the aggregation operation, and arranges the data rows according to the aggregated values.

In some implementations, the LOD expression has the format {Keyword1 [Fieldlist1] SORT [Fieldlist2] BY AGG (Field3) : analytic_expression()}. keyword1 is the first keyword. [Fieldlist1] is the dimensionality expression and comprises a list of one or more ordering data fields. [Fieldlist2] is a list of one or more dimension data fields. (Field 3) is the measure data field, and AGG is an aggregation operator corresponding to the aggregation operation. In some implementations, the LOD expression further includes a sort direction keyword following (Field 3). In some implementations, (Field3) is a single measure data field.

In some implementations, translating the LOD expression into one or more executable database queries includes translating the LOD expression into a second query that includes an ORDER BY operator that arranges data rows in an order according to the measure data field and a GROUP BY operator that partitions the data rows according to the list of ordering data fields.

In some implementations, the aggregation operator is SUM, AVG, COUNT, COUNTD, MIN, or MAX.

In some implementations, identifying the one or more data fields includes identifying a first dimension data field as a partitioning field by which the data rows are partitioned.

In some implementations, the data visualization is displayed in a graphical user interface of the computing device.

In some implementations, a computing device includes one or more processors, memory, and one or more programs stored in the memory. The programs are configured for execution by the one or more processors. The one or more programs include instructions for performing any of the methods described herein.

In some implementations, a non-transitory computer-readable storage medium stores one or more programs configured for execution by a computing device having one or more processors and memory. The one or more programs include instructions for performing any of the methods described herein.

Thus methods, systems, and graphical user interfaces are disclosed that enable users to easily interact with data visualizations and analyze data using LOD expressions.

BRIEF DESCRIPTION OF THE DRAWINGS

For a better understanding of the aforementioned systems, methods, and graphical user interfaces, as well as additional systems, methods, and graphical user interfaces that provide data visualization analytics, reference should be made to the Description of Implementations below, in conjunction with the following drawings in which like reference numerals refer to corresponding parts throughout the figures.

FIGS. 7A-7E provide a flowchart of a method performed at a computing device according to some implementations.

Reference will now be made to implementations, examples of which are illustrated in the accompanying drawings. In the following description, numerous specific details are set forth in order to provide a thorough understanding of the present invention. However, it will be apparent to one of ordinary skill in the art that the present invention may be practiced without requiring these specific details.

DESCRIPTION OF IMPLEMENTATIONS

Figure 1:
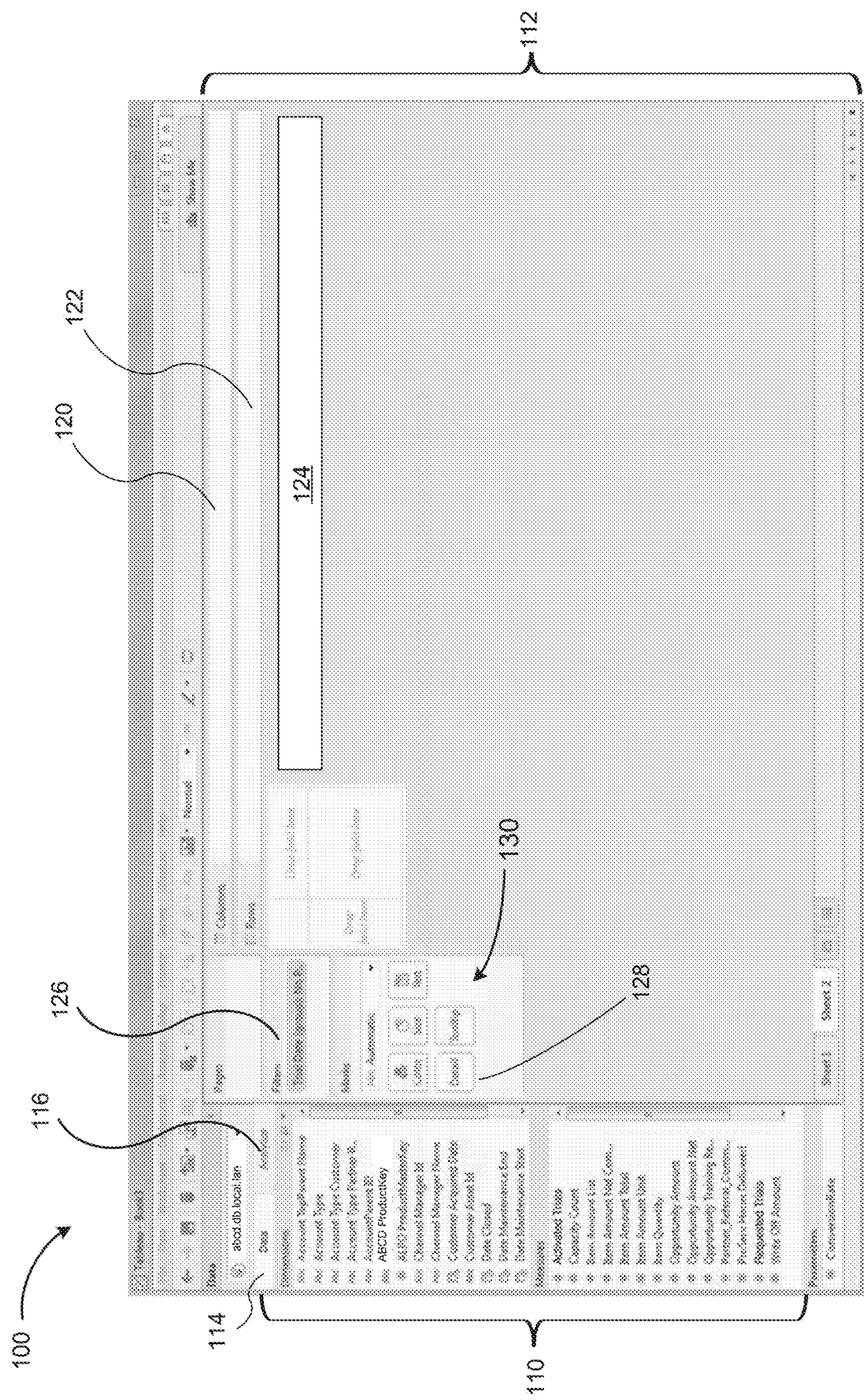
FIG. 1 shows a graphical user interface used in some implementations.

FIG. 1 shows a graphical user interface 100 for interactive data analysis. The user interface 100 includes a Data tab 114 and an Analytics tab 116 in accordance with some implementations. When the Data tab 114 is selected, the user interface 100 displays a schema information region 110, which is also referred to as a data pane. The schema information region 110 provides named data elements (e.g., field names) that may be selected and used to build a data visualization. In some implementations, the list of field names is separated into a group of dimensions (e.g., categorical data) and a group of measures (e.g., numeric quantities). Some implementations also include a list of parameters. When the Analytics tab 116 is selected, the user interface displays a list of analytic functions instead of data elements (not shown).

The graphical user interface 100 also includes a data visualization region 112. The data visualization region 112 includes a plurality of shelf regions, such as a columns shelf region 120 and a rows shelf region 122. These are also referred to as the column shelf 120 and the row shelf 122. As illustrated here, the data visualization region 112 also has a large space for displaying a visual graphic (also referred to herein as a data visualization). Because no data elements have been selected yet, the space initially has no visual graphic. In some implementations, the data visualization region 112 has multiple layers that are referred to as sheets. In some implementations, the data visualization region 112 includes a region 126 for data visualization filters.

In some implementations, the shelf regions determine characteristics of a desired data visualization. For example, a user can place field names into these shelf regions (e.g., by dragging fields from the schema information region 110 to the column shelf 120 and/or the row shelf 122), and the field names define the data visualization characteristics. A user may choose a vertical bar chart, with a column for each distinct value of a field placed in the column shelf region. The height of each bar is defined by another field placed into the row shelf region.

In some implementations, the graphical user interface 100 includes a natural language input box 124 (also referred to as a command box) for receiving natural language commands. A user may interact with the command box to provide commands. For example, the user may provide a natural language command by typing in the box 124. In addition, the user may indirectly interact with the command box by speaking into a microphone 220 to provide commands. In some implementations, data elements are initially associated with the column shelf 120 and the row shelf 122 (e.g., using drag and drop operations from the schema information region 110 to the column shelf 120 and/or the row shelf 122). After the initial association, the user may use natural language commands (e.g., in the natural language input box 124) to further explore the displayed data visualization. In some instances, a user creates the initial association using the natural language input box 124, which results in one or more data elements being placed on the column shelf 120 and on the row shelf 122. For example, the user may provide a command to create a relationship between a data element X and a data element Y. In response to receiving the command, the column shelf 120 and the row shelf 122 may be populated with the data elements (e.g., the column shelf 120 may be populated with the data element X and the row shelf 122 may be populated with the data element Y, or vice versa).

In some implementations, the graphical user interface 100 includes a view level detail icon 128, which can be used to specify or modify the level of detail for the data visualization. The view level detail icon 128 enables a user to specify a level of detail that applies to the data visualization overall or to specify additional fields that will be included in the overall level of detail (in addition to those that are included by default). Typically, implementations have only one "overall" level of detail. Other levels of detail may be specified within individual contexts, as described below.

In some implementations, the graphical user interface 100 includes an encodings region 130 to specify various encodings for a data visualization.

Figure 2:
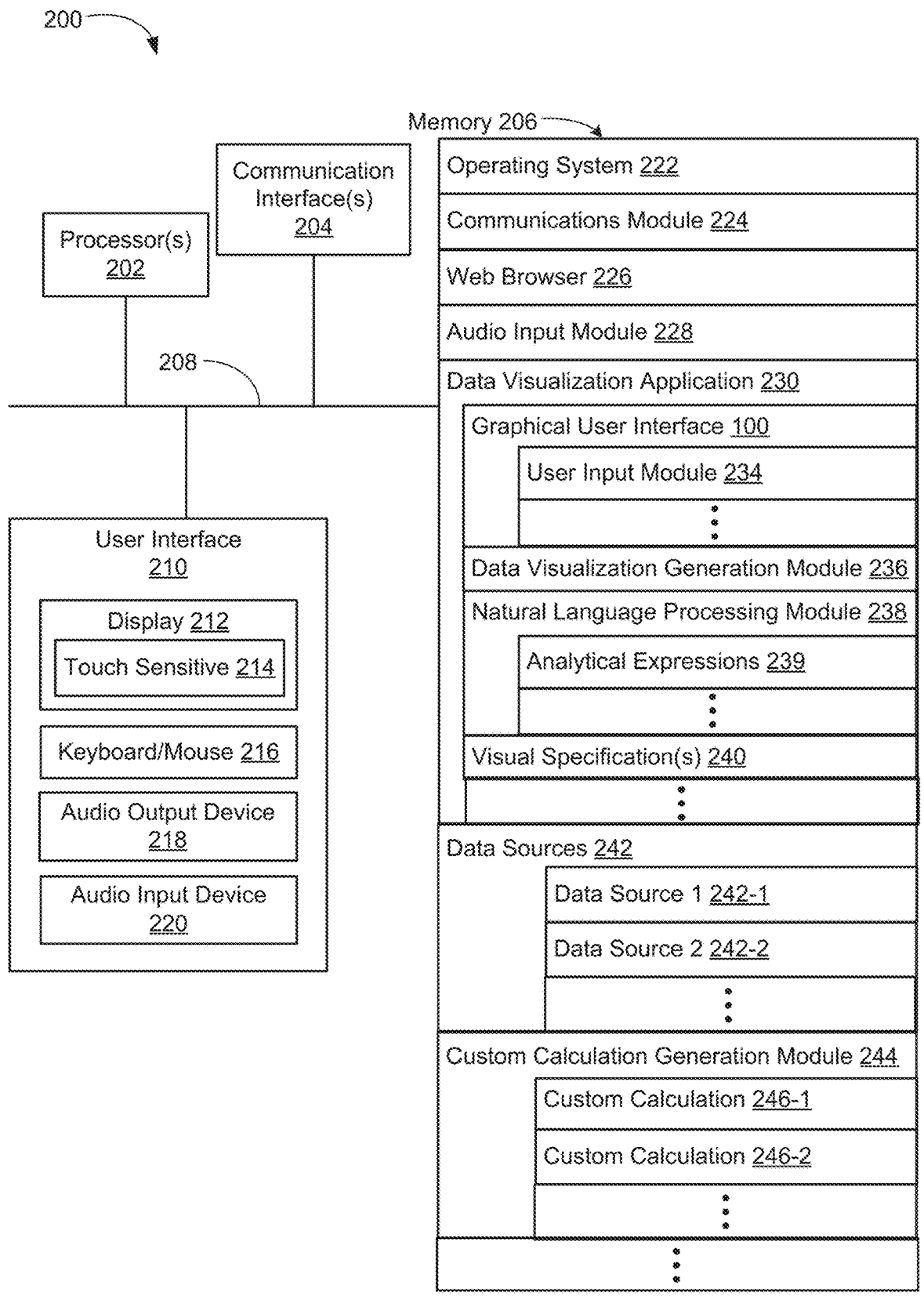
FIG. 2 is a block diagram of a computing device according to some implementations.

FIG. 2 is a block diagram illustrating a computing device 200 that can display the graphical user interface 100 in accordance with some implementations. Various examples of the computing device 200 include a desktop computer, a laptop computer, a tablet computer, and other computing devices that have a display and a processor capable of running a data visualization application 230. The computing device 200 typically includes one or more processing units (processors or cores) 202, one or more network or other communication interfaces 204, memory 206, and one or more communication buses 208 for interconnecting these components. The communication buses 208 optionally include circuitry (sometimes called a chipset) that interconnects and controls communications between system components. The computing device 200 includes a user interface 210. The user interface 210 typically includes a display device 212. In some implementations, the computing device 200 includes input devices such as a keyboard, mouse, and/or other input buttons 216. Alternatively or in addition, in some implementations, the display device 212 includes a touch-sensitive surface 214, in which case the display device 212 is a touch-sensitive display. In some implementations, the touch-sensitive surface 214 is configured to detect various swipe gestures (e.g., continuous gestures in vertical and/or horizontal directions) and/or other gestures (e.g., single/double tap). In computing devices that have a touch-sensitive display 214, a physical keyboard is optional (e.g., a soft keyboard may be displayed when keyboard entry is needed). The user interface 210 also includes an audio output device 218, such as speakers or an audio output connection connected to speakers, earphones, or headphones. Furthermore, some computing devices 200 use a microphone and voice recognition to supplement or replace the keyboard. Optionally, the computing device 200 includes an audio input device 220 (e.g., a microphone) to capture audio (e.g., speech from a user).

In some implementations, the memory 206 includes high-speed random-access memory, such as DRAM, SRAM, DDR RAM, or other random-access solid-state memory devices; and may include non-volatile memory, such as one or more magnetic disk storage devices, optical disk storage devices, flash memory devices, or other non-volatile solid-state storage devices. In some implementations, the memory 206 includes one or more storage devices remotely located from the processor(s) 202. The memory 206, or alternatively the non-volatile memory device(s) within the memory 206, includes a non-transitory computer-readable storage medium. In some implementations, the memory 206 or the computer-readable storage medium of the memory 206 stores the following programs, modules, and data structures, or a subset or superset thereof:

an operating system 222, which includes procedures for handling various basic system services and for performing hardware dependent tasks;

a communications module 224, which is used for connecting the computing device 200 to other computers and devices via the one or more communication interfaces 204 (wired or wireless), such as the Internet, other wide area networks, local area networks, metropolitan area networks, and so on;

optionally, a web browser 226 (or other application capable of displaying web pages), which enables a user to communicate over a network with remote computers or devices;

optionally, an audio input module 228 (e.g., a microphone module) for processing audio captured by the audio input device 220. The captured audio may be sent to a remote server and/or processed by an application executing on the computing device 200 (e.g., the data visualization application 230);

a data visualization application 230 for generating data visualizations and related features. In some implementations, the data visualization application 230 includes:

a graphical user interface 100 for a user to construct visual graphics. In some implementations, the graphical user interface includes a user input module 234 for receiving user input through the natural language box 124 (FIG. 1). For example, a user inputs a natural language command or expression into the natural language box 124 identifying one or more data sources 242 (which may be stored on the computing device 200 or stored remotely) and/or data fields from the data sources. In some implementations, the natural language expression is a voice utterance captured by the audio input device 220. The selected fields are used to define a visual graphic. The data visualization application 230 then displays the generated visual graphic in the user interface 100. In some implementations, the data visualization application 230 executes as a standalone application (e.g., a desktop application). In some implementations, the data visualization application 230 executes within the web browser 226 or another application using web pages provided by a web server. In some implementations, the graphical user interface 100 includes an aggregation definition window, which enables a user to specify what aggregation operator is used (e.g., SUM, COUNT, MIN, MAX, or AVERAGE) and how the data is grouped for the aggregation. In some implementations, the graphical user interface 100 includes a calculation edit window, which allows a user to enter or edit expressions of any complexity (e.g., expressions that are parsable according to a specified expression syntax);

a data visualization generation module 236, which automatically generates and displays a corresponding visual graphic (also referred to as a "data visualization" or a "data viz") using the user input (e.g., the natural language input);

optionally, a natural language processing module 238 for processing (e.g., interpreting) natural language inputs (e.g., commands) received using the natural language box 124. In some implementations, the natural language processing module 238 parses the natural language command (e.g., into tokens) and translates the command into an intermediate language (e.g., ArkLang). The natural language processing module 238 recognizes analytical expressions 239 and forms intermediate expressions accordingly. The natural language processing module 238 also translates (e.g., compiles) the intermediate expressions into database queries by employing a visualization query language to issue the queries against a database or data source 242 and to retrieve one or more data sets from the database or data source 242;

visual specifications 240, which are used to define characteristics of a desired data visualization. In some implementations, the information the user provides (e.g., user input) is stored as a visual specification. In some implementations, the visual specifications 240 includes previous natural language commands received from a user or properties specified by the user through natural language commands. In some implementations, the visual specification 240 includes two or more aggregations based on different levels of detail. Further information about levels of detail can be found in U.S. patent application Ser. No. 14/801,750, filed Jul. 16, 2015, titled "Systems and Methods for using Multiple Aggregation Levels in a Single Data Visualization," which is incorporated by reference herein in its entirety;

zero or more data sources 242 (e.g., a first data source 242-1 and a second data source 242-2), which are used by the data visualization application 230. In some implementations, the data sources are stored as spreadsheet files, CSV files, XML files, flat files, or JSON files, or stored in a relational database. For example, a user selects one or more databases or data sources 242 (which may be stored on the computing device 200 or stored remotely), selects data fields from the data sources, and uses the selected fields to define a visual graphic; and a custom calculation generation module 244, which generates and/or stores custom calculations 246 (e.g., custom calculations 246-1 and 246-2, which are sometimes called Level of Detail (LOD) calculations) based on user selection of data fields (e.g., dimension data fields and/or measure data fields).

Although FIG. 2 shows a computing device 200, FIG. 2 is intended more as a functional description of the various features that may be present rather than as a structural schematic of the implementations described herein. In practice, and as recognized by those of ordinary skill in the art, items shown separately could be combined and some items could be separated.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 206 stores a subset of the modules and data structures identified above. Furthermore, the memory 206 may store additional modules or data structures not described above.

Figure 3:
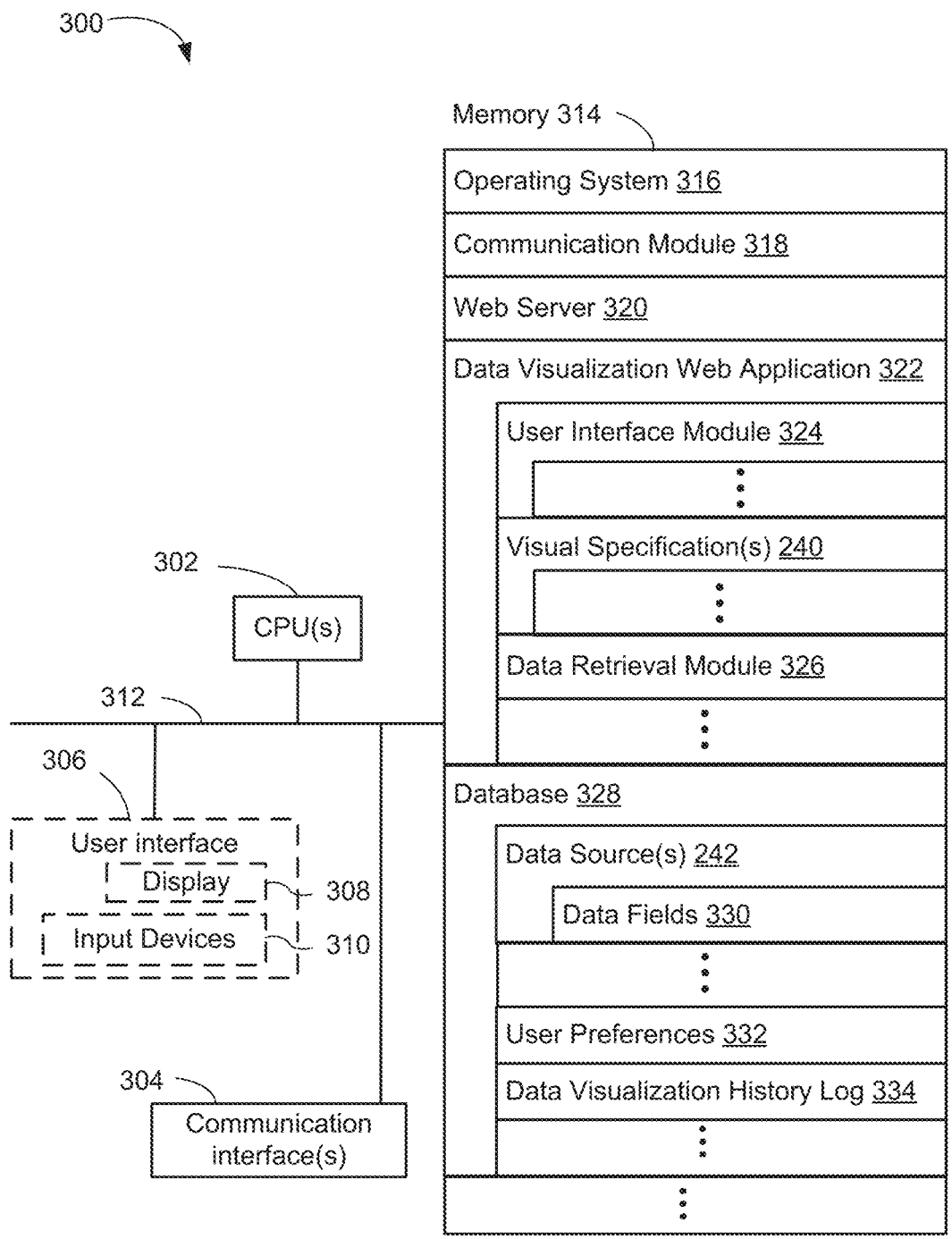
FIG. 3 is a block diagram of a data visualization server according to some implementations.

FIG. 3 is a block diagram of a data visualization server 300 in accordance with some implementations. A data visualization server 300 may host one or more databases 328 or may provide various executable applications or modules. A server 300 typically includes one or more processing units/cores (CPUs) 302, one or more network interfaces 304, memory 314, and one or more communication buses 312 for interconnecting these components. In some implementations, the server 300 includes a user interface 306, which includes a display 308 and one or more input devices 310, such as a keyboard and a mouse. In some implementations, the communication buses 312 includes circuitry (sometimes called a chipset) that interconnects and controls communications between system components.

In some implementations, the memory 314 includes high-speed random access memory, such as DRAM, SRAM, DDR RAM, or other random access solid state memory devices, and may include non-volatile memory, such as one or more magnetic disk storage devices, optical disk storage devices, flash memory devices, or other non-volatile solid state storage devices. In some implementations, the memory 314 includes one or more storage devices remotely located from the CPUs 302. The memory 314, or alternatively the non-volatile memory devices within the memory 314, comprise a non-transitory computer readable storage medium.

In some implementations, the memory 314 or the computer readable storage medium of the memory 314 stores the following programs, modules, and data structures, or a subset thereof:

an operating system 316, which includes procedures for handling various basic system services and for performing hardware dependent tasks;

a network communication module 318, which is used for connecting the server 300 to other computers via the one or more communication network interfaces 304 (wired or wireless) and one or more communication networks, such as the Internet, other wide area networks, local area networks, metropolitan area networks, and so on;

a web server 320 (such as an HTTP server), which receives web requests from users and responds by providing responsive web pages or other resources;

a data visualization web application 322, which may be downloaded and executed by a web browser 226 on a user's computing device 200. In general, a data visualization web application 322 has the same functionality as a desktop data visualization application 230, but provides the flexibility of access from any device at any location with network connectivity, and does not require installation and maintenance. In some implementations, the data visualization web application 322 includes various software modules to perform certain tasks. In some implementations, the web application 322 includes a user interface module 324, which provides the user interface for all aspects of the web application 322. In some implementations, the web application 322 includes a data retrieval module 326, which builds and executes queries to retrieve data from one or more data sources 242. The data sources 242 may be stored locally on the server 300 or stored in an external database 328. In some implementations, data from two or more data sources may be blended. In some implementations, the data retrieval module 326 uses a visual specification 240 to build the queries. In some implementations, the visual specification includes one or more aggregate specifications;

one or more databases 328, which store data used or created by the data visualization web application 322 or data visualization application 230. The databases 328 may store data sources 242, which provide the data used in the generated data visualizations. Each data source 242 includes one or more data fields 330. In some implementations, the database 328 stores user preferences 332. In some implementations, the database 328 includes a data visualization history log 334. In some implementations, the history log 334 tracks each time the data visualization renders a data visualization.

The databases 328 may store data in many different formats, and commonly includes many distinct tables, each with a plurality of data fields 330. Some data sources comprise a single table. The data fields 330 include both raw fields from the data source (e.g., a column from a database table or a column from a spreadsheet) as well as derived data fields, which may be computed or constructed from one or more other fields. For example, derived data fields include computing a month or quarter from a date field, computing a span of time between two date fields, computing cumulative totals for a quantitative field, computing percent growth, and so on. In some instances, derived data fields are accessed by stored procedures or views in the database. In some implementations, the definitions of derived data fields 330 are stored separately from the data source 242. In some implementations, the database 328 stores a set of user preferences 332 for each user. The user preferences may be used when the data visualization web application 322 (or application 230) makes recommendations about how to view a set of data fields 330. In some implementations, the database 328 stores a data visualization history log 334, which stores information about each data visualization generated. In some implementations, the database 328 stores other information, including other information used by the data visualization application 230 or data visualization web application 322. The databases 328 may be separate from the data visualization server 300, or may be included with the data visualization server (or both).

In some implementations, the data visualization history log 334 stores the visual specifications 240 selected by users, which may include a user identifier, a timestamp of when the data visualization was created, a list of the data fields used in the data visualization, the type of the data visualization (sometimes referred to as a "view type" or a "chart type"), data encodings (e.g., color and size of marks), the data relationships selected, and what connectors are used. In some implementations, one or more thumbnail images of each data visualization are also stored. Some implementations store additional information about created data visualizations, such as the name and location of the data source, the number of rows from the data source that were included in the data visualization, the version of the data visualization software, and so on.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 314 stores a subset of the modules and data structures identified above. Furthermore, the memory 314 may store additional modules or data structures not described above.

Although FIG. 3 shows a data visualization server 300, FIG. 3 is intended more as a functional description of the various features that may be present rather than as a structural schematic of the implementations described herein. In practice, and as recognized by those of ordinary skill in the art, items shown separately could be combined and some items could be separated. In addition, some of the programs, functions, procedures, or data shown above with respect to a server 300 may be stored or executed on a computing device 200. In some implementations, the functionality and/or data may be allocated between a computing device 200 and one or more servers 300. Furthermore, one of skill in the art recognizes that FIG. 3 need not represent a single physical device. In some implementations, the server functionality is allocated across multiple physical devices that comprise a server system. As used herein, references to a "server" or "data visualization server" include various groups, collections, or arrays of servers that provide the described functionality, and the physical servers need not be physically colocated (e.g., the individual physical devices could be spread throughout the United States or throughout the world).

FIGS. 4A-4I illustrate some aspects of using multiple levels of detail according to some implementations. To simplify this discussion, these figures refer to LOD expressions in a text-based format, regardless of whether the expressions are created using graphical user interface controls or entered as text.

The results for a calculation such as SUM([Sales]) depend on the context. In some implementations, the context is defined by the filters and level of detail. In some implementations, dimension fields on rows, columns, color, size, label, detail, or path shelves define the level of detail for the sheet.

For example if the [State] dimension field is on the row shelf 120, SUM([Sales]) will compute the sum of all transactions for each [State]. If the [Product Type] is also on one of the shelves (e.g., column shelf 120 or row shelf 122), SUM([Sales]) will compute the sum of all transactions within each [State] for each [Product Type]. The more dimensions in the sheet or the more unique members each dimension contains, the more granular the results will be. Because each result is drawn as a mark in the visualization, the finer the level of detail for the sheet, the more marks there will be.

Figures 4A, 4B:
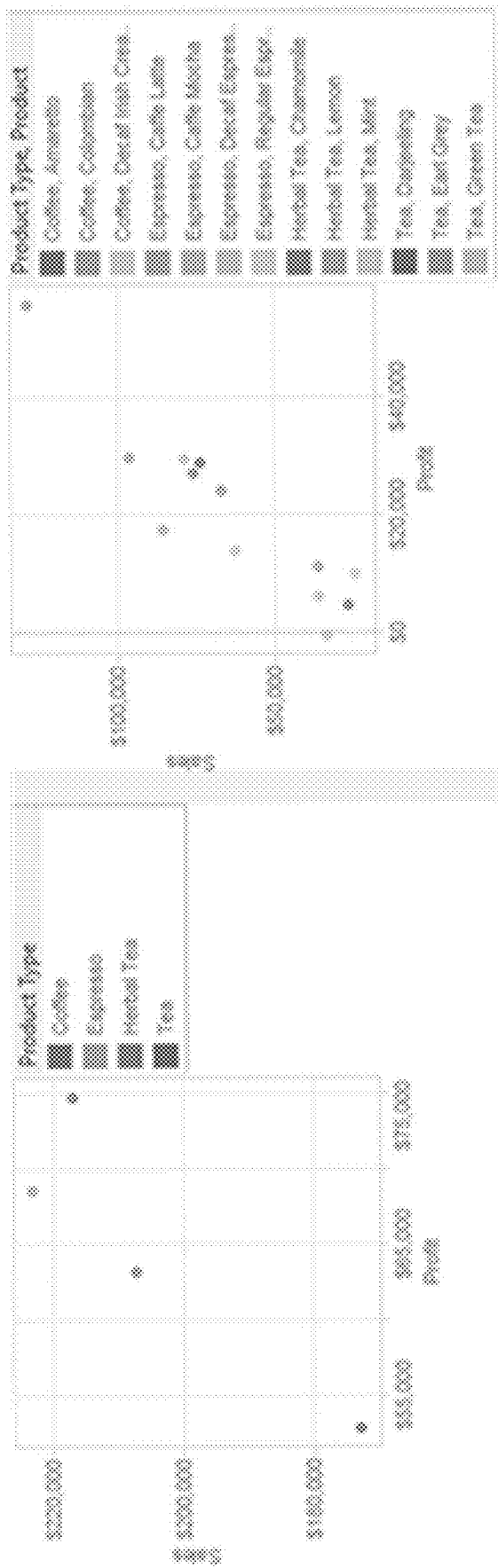
FIGS. 4A-4I illustrate some aspects of using multiple levels of detail according to some implementations.

FIG. 4A is an example using a Coffee Chain dataset. The image on the left has Product Type as the only dimension in the sheet. The one on the right uses Product Type and Product, giving it finer granularity, and thus more marks.

Filters, on the other hand, change the context by reducing the number of data points used in the calculation. For example, a filter may remove a state based on name, basedon profit being below zero, or based on not being in the top 5. In some implementations, a data visualization can use a table calculation as a filter, but this is an exception. When using a table calculation as a filter, it just hides marks without changing the data over which the calculations operate.

Level of detail expressions allow a user to individually specify the context for a calculation. For example the LOD expression {fixed [State] : SUM([Sales])} will always calculate the sum of sales per state regardless of sheet's level of detail. It also ignores the filters in effect, with some exceptions described below with respect to FIG. 4E.

Level of detail expressions provide many useful features, including: the ability to use the results mixed with row level values; move the calculation of the mixed and multi-level aggregate calculations to the database server (which can be more efficient than local calculations); use results as dimensions; use results for table calculation addressing or partitioning; or for binning (e.g., grouping together data based on an aggregated calculation).

In some implementations, a level of detail expression has the following structure {keyword [dimension1],[dimension2]. . . : aggregate expression}, as illustrated in FIG. 4B. The dimensionality expression 412 consists of 0 or more dimensions, which are typically fields from one of the data sources. In some implementations, one or more of the dimensions in the dimensionality expression 412 can be an expression, such as LEFT([Name], 3). When there are two or more dimensions in the dimensionality expression 412, they are separated with commas. The aggregate expression 414 can be a simple aggregate expression, such as SUM (Sales) or MIN(Order Date). In some cases, the aggregate expression 414 can be more complex, such as AVG ([weight]-{fixed [height],[gender] : AVG([weight])}). An aggregate expression 414 must include an aggregation, but it can include other calculations, or even include an IF block (e.g., perform one aggregate calculation in one case, and a different aggregate calculation otherwise). See, for example, U.S. patent application Ser. No. 14/801,750, filed Jul. 16, 2015, entitled "Systems and Methods for using Multiple Aggregation Levels in a Single Data Visualization," which is incorporated by reference herein in its entirety.

In some implementations, an LOD expression can include a keyword 410, which specifies how the dimensionality expression 412 is used, and how the LOD expression interacts with filters. When the keyword is "fixed," the aggregate expression groups data using only the dimension fields listed in the dimensionality expression 412. When the keyword is "include," the aggregate expression combines the dimensions listed in the dimensionality expression 412 with dimensions in the sheet. This can be useful for calculating at a fine level of detail in the database then re-aggregating to show data at a coarser level of detail in the visualization. This can also be useful when a calculation's level of detail needs to change when drilling down or more dimensions are added to the sheet. When the keyword is "exclude," the aggregate expression removes the dimensions listed in the dimensionality expression from dimensions in the sheet. This is useful for computing a 'percent of total' or a 'difference from overall average.' This can also be used to compute totals and create reference lines.

When the keyword 410 is "fixed" and no dimensions are included in the dimensionality expression 412, the aggregation computes a single result for the entire source table. For example, {fixed : MIN([Order Date])} specifies computing an aggregate minimum for all records in the table. In some instances when the keyword is "fixed" and no dimensions are specified, the keyword and colon are omitted, creating a shorthand such as {MIN([Order Date])}. This particular example specifies computing the date of the very first sale to the very first customer.

Because the level of detail of the sheet determines the number of marks drawn in the visualization, when a calculation has a different level of detail, something needs to be done to reconcile the difference. Note that the different level of detail can be finer or coarser than the level of detail for the sheet.

Figure 4C:
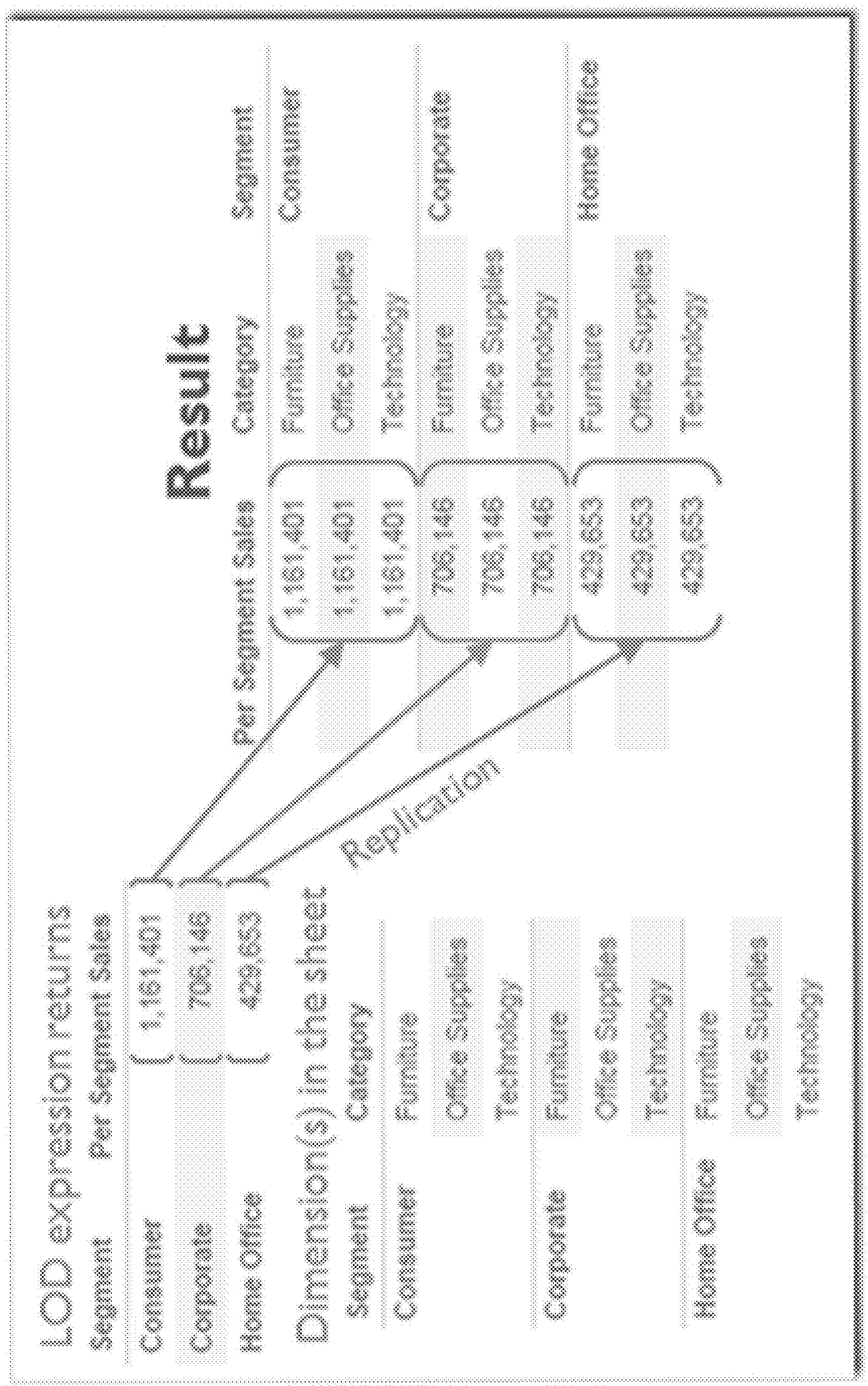

When the calculation has a coarser level of detail, some implementations replicate the results as needed so that there is an appropriate calculated value for each mark. For example, FIG. 4C illustrates computing a sum of sales for each segment, using the LOD expression {fixed [Segment] : SUM([Sales])}. This aggregation is coarser than the data visualization, where the level of detail includes both segment and category. The data for the LOD expression is therefore "replicated" to each tuple based on the segment of the tuple, as illustrated in FIG. 4C.

Because the coarse aggregation is replicated to each corresponding tuple, a user can specify a "row" calculation that uses an aggregated result. For example, consider the case where a user wants to calculate the difference between the dollar amounts of individual transactions and the average dollar amount for that customer. Using an LOD expression, this can be computed as [Transaction Amount]-{fixed [Customer ID] : AVG([Transaction Amount])}.

Figure 4D:
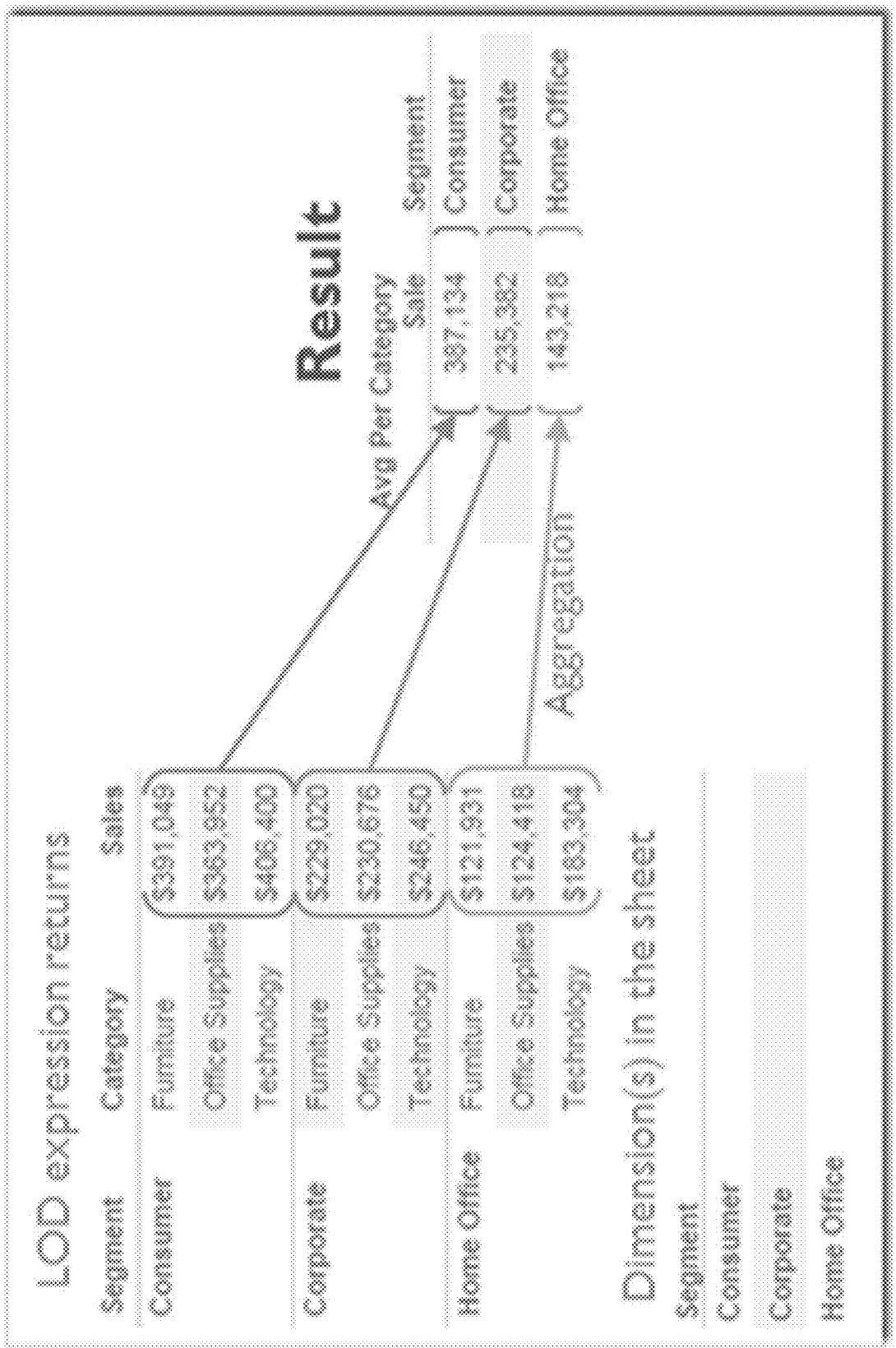

On the other hand, when the aggregate calculation has a finer level of detail than the data visualization, implementations aggregate the results as needed so that there is only one value for each mark. This is illustrated in FIG. 4D, where the LOD expression is {fixed [Segment], [Category] : SUM([Sales])}, whereas the visualization has a level of detail that includes only the segment field. In this example, the user has selected to average the results.

When the "include" keyword is used in an LOD expression, the calculation will always have a level of detail that is either the same as the sheet or finer than the sheet. When it is finer, aggregation is required to match the sheet's level of detail. When the "fixed" keyword is used in an LOD expression, the calculation can have a level of detail that is coarser or finer than the sheet, depending on the calculation and dimensions in the sheet. Because the need to aggregate or not depends on what dimensions are in sheet, this can change anytime based on user selections.

Having an aggregation defined is safe because if and when aggregation is needed, the data visualization application knows what to do. A calculation with a custom level of detail is typically wrapped in an aggregate at the sheet level, as illustrated in FIGS. 5A-5G of U.S. patent application Ser. No. 14/801,750, which is incorporated by reference herein in its entirety. An exception is when the custom calculation is used as a dimension, as illustrated in FIGS. 6A-6I, 7A, and 7B of U.S. patent application Ser. No. 14/801,750. When the calculation has the same level of detail as the sheet or is coarser (and thus replicated), changing the aggregation for the calculation does not make any difference in the results.

Some implementations have different default behavior when the "exclude" keyword is selected. For example, in some implementations, when a pill is dragged that has an exclude calculation, the data visualization application defaults to using the ATTR operator rather than SUM or AVG. With "exclude," the calculation for the LOD expression is coarser than (or the same as) the sheet, so the data computed by the LOD expression will be replicated, and thus computing a sum or average would not be useful.

In some implementations, level of detail expressions rely on database queries to calculate the results. In some implementations, the LOD expressions are translated into subqueries with inner joins or cross joins. If the database does not support a CROSS JOIN operator, the data visualization application 230 or data retrieval module 326 creates a join without an ON/WHERE clause, or creates one that always returns true to get the same effect.

Cross-joins are used when there is no common dimension to join on. For example {MIN([Order Date])} is a single value, which is repeated for every row, so there is no need for a join key. It is a cross-join between the main table (that defines the sheet) and a one-row table (resulting from the calculation of the LOD expression).

There are many other cases as well. For example, consider the calculation {exclude [State] : AVG([Sales])} inside a Sheet where [State] is the only dimension. This results in "blank" dimensionality because the LOD expression excludes the one dimension used in the sheet. In this case, a cross-join query is generated.

Figure 4E:
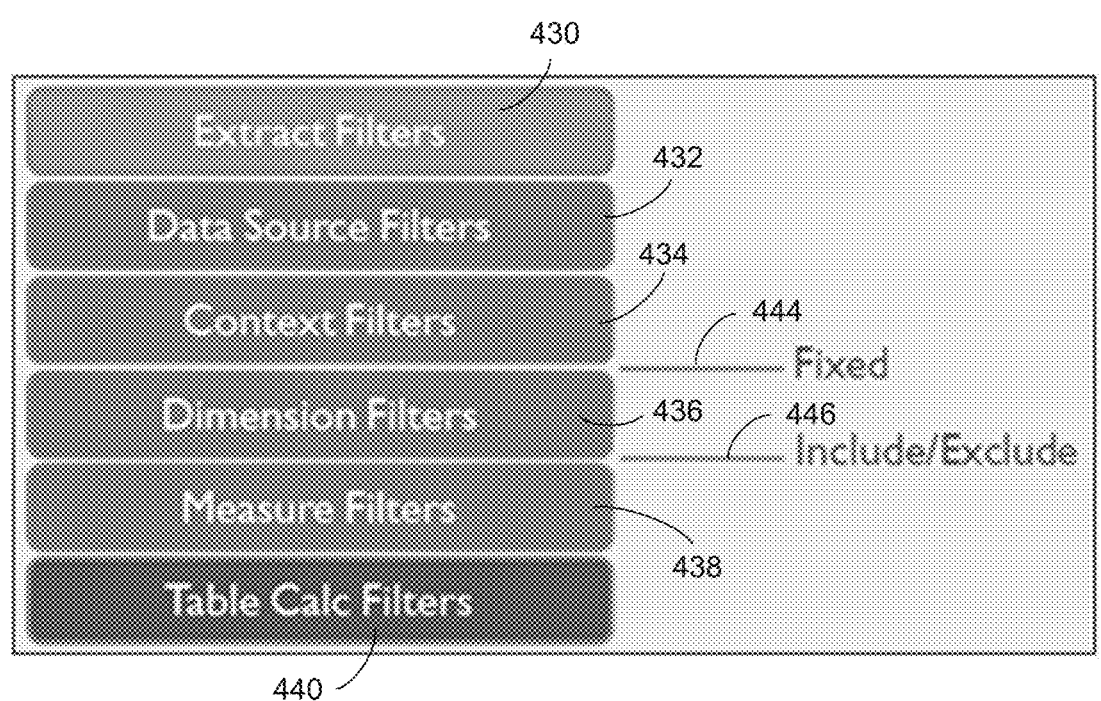

A data visualization can use various types of filters, and these filters affect LOD expressions in different ways. A summary of filter types, and the order in which they are executed (top to bottom) is shown in FIG. 4E.

Extract filters 430 are only relevant if a user creates an extract from a data source. If so, only data from the extract is available for any calculations. Some implementations also enable data source filters 432, which have a similar effect as an extract filter, but without creating an extract. Table calculation filters 440 apply only after the calculations are executed, and these filters hide certain marks without filtering out the underlying data used in calculations.

Although implementations do not require SQL or an SQL database, dimension and measure filters can be understood by analogy with SQL syntax. A dimension filter 436 corresponds to a WHERE clause, and a measure filter 438 corresponds to a HAVING clause.

Fixed LOD calculations are executed (444) before dimension filters. Because of this, a fixed LOD calculation ignores any dimension filters that are applied at the sheet level. This can be very useful. For example, consider the scenario where a user wants to compute each state's total sales as a fraction of the total sales in the United States. The expression SUM([Sales])/ATTR({SUM([Sales])}) does the job, where the portion {SUM([Sales])} is shorthand for {fixed : SUM([Sales])}. Note that in some implementations the ATTR()may be omitted. The expression {fixed : SUM([Sales])} computes the total of all sales, and thus the ratio computes the fraction for each state as desired. Now suppose a user adds a filter to the sheet to hide some of the states. The created dimension filter affects the numerator, but not the denominator. The denominator is fixed, so the total is the sum for all states, regardless of what is displayed in the data visualization. Without this LOD calculation feature, it would be very difficult to create a calculation that behaved "correctly" when a filter was applied.

Some implementations enable a user to designate certain filters as context filters 1134, which gives the user the ability to control whether data is included in fixed LOD calculations.

In some implementations, "include" and "exclude" LOD calculations execute (446) after dimension filters 436, just like any other measure calculation. If a user wants filters to apply to an LOD expression, but doesn't want to use a context filter 434, the LOD calculation can be written to use the "exclude" or "include" keyword 410.

To understand how LOD expressions interact with computed totals, it is useful to understand the types of totals that data visualization applications provide. Some data visualization applications provide two kinds of totals: Ordinary Totals (aka "Totals" or "single-pass" totals) and Visual Totals (aka "two-pass" totals). Ordinary totals apply the current aggregation type (e.g., SUM, AVERAGE, or MIN) at a coarser level of detail than the sheet. This is typically the default setting when totals are turned on. In some implementations, this option is referred to as "Automatic."

Figure 4F:
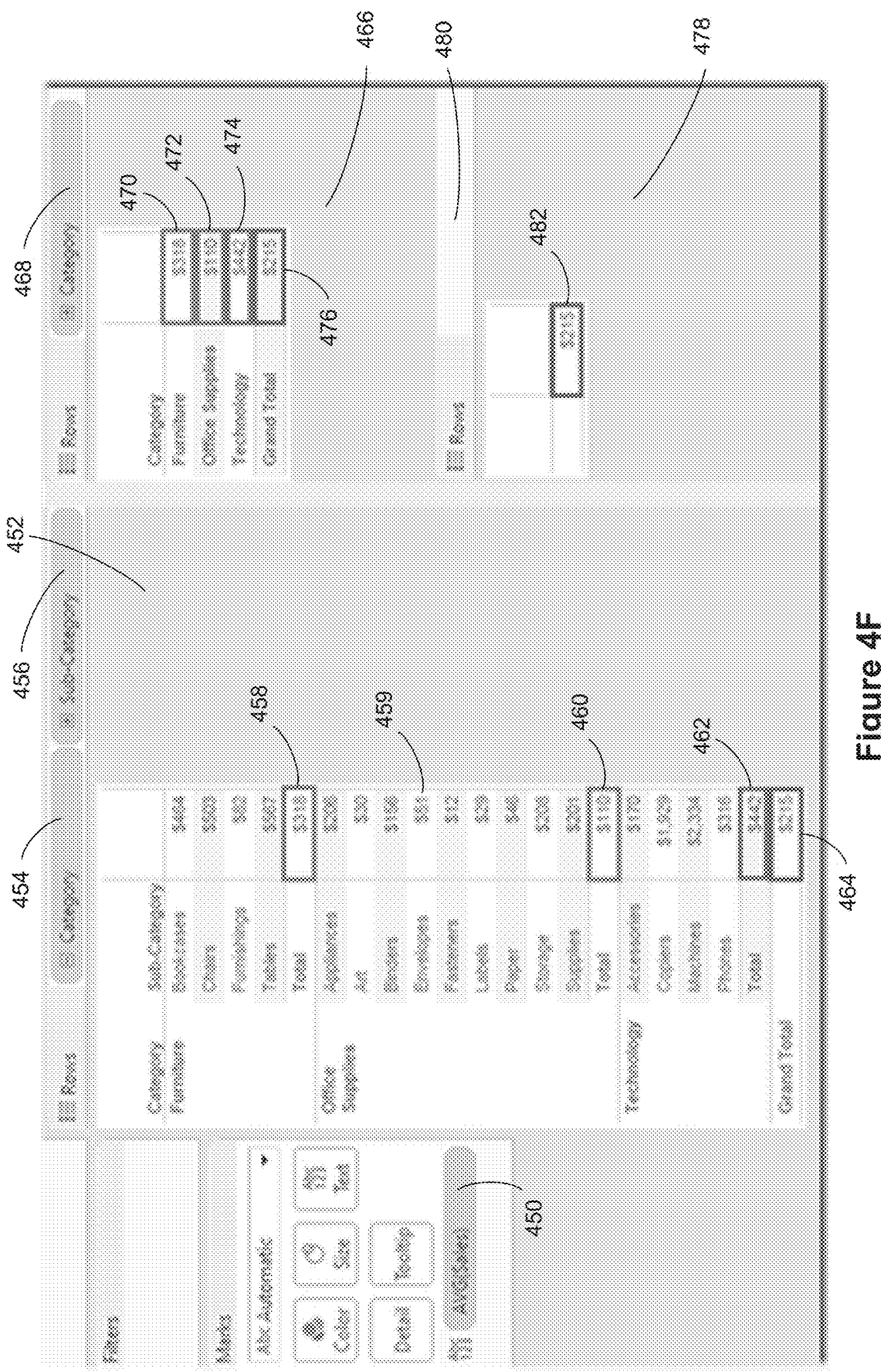

FIG. 4F provides an example of single-pass totals at various levels of detail. As shown on the left, the user has selected to have marks displayed as text showing average sales 450. Because the aggregation operator AVG is specified, all of the totals are computed as averages of sales.

FIG. 4F actually shows three distinct data visualizations 452, 466, and 478, each based on a different set of dimensions placed on the rows shelf. In the first data visualization 452, the user has placed the dimension fields Category 454 and Sub-Category 456 on the rows shelf, and these form the level of detail for the sheet (and thus for the visualization). With automatic totals, totals (single-pass) are computed. First, subtotals 458, 460, and 462 are computed for each category. Second, a grand total 464 is computed. Note that the subtotals do not "add up" because they are computed averages. Furthermore, each "subtotal" is not the average of the values above it because an average of an average is not the same as an average of the raw data. Here, each mark, such as the Office Supplies/Envelopes mark 459, is a computed average of sales transactions for the specified item. Each category subtotal, such as the office supplies subtotal 460, is an average for individual sales transactions in the office supplies category. Finally, the "grand total" 464 is the average of all sales transactions.

In the second visualization 466, the user has placed only the dimension field Category 468 on the rows shelf, so the level of detail for the second visualization is just category. The visualization computes average sales 470, 472, and 474 for each of the categories, as well as a grand total 476. As illustrated here, the subtotals in the first data visualization 452 match AVG(Sales) per Category in the second data visualization 466, and the first grand total 1164 matches the second grand total 476.

In the third visualization 478, the user has not placed any dimension fields on the rows shelf, so the rows shelf is empty (480). In addition, there are no dimension fields used elsewhere, so the data is aggregated to a single row 482, which computes AVG(Sales) for the entire table. Note that this matches the grand totals 464 and 476 from the first and second visualizations (each one computes AVG(Sales) for the entire set of transactions).

If a user wanted the Total rows to show the average of the rows above them (e.g., computing the average of the values displayed for Bookcases, Chairs, Furnishings, and Tables for the Furniture category), some implementations enable a user to use Visual Totals, which execute in two passes. In some implementations, a user can switch to visual totals by changing the "Total Using" setting from "Automatic" to the desired aggregation type (e.g., SUM or AVERAGE) to be used in the second pass.

Note that values for single pass and two pass will be the same in many common cases. For example, this occurs when computing a SUM of a SUM, a MAX of a MAX, or a MIN or a MIN.

Figure 4G:
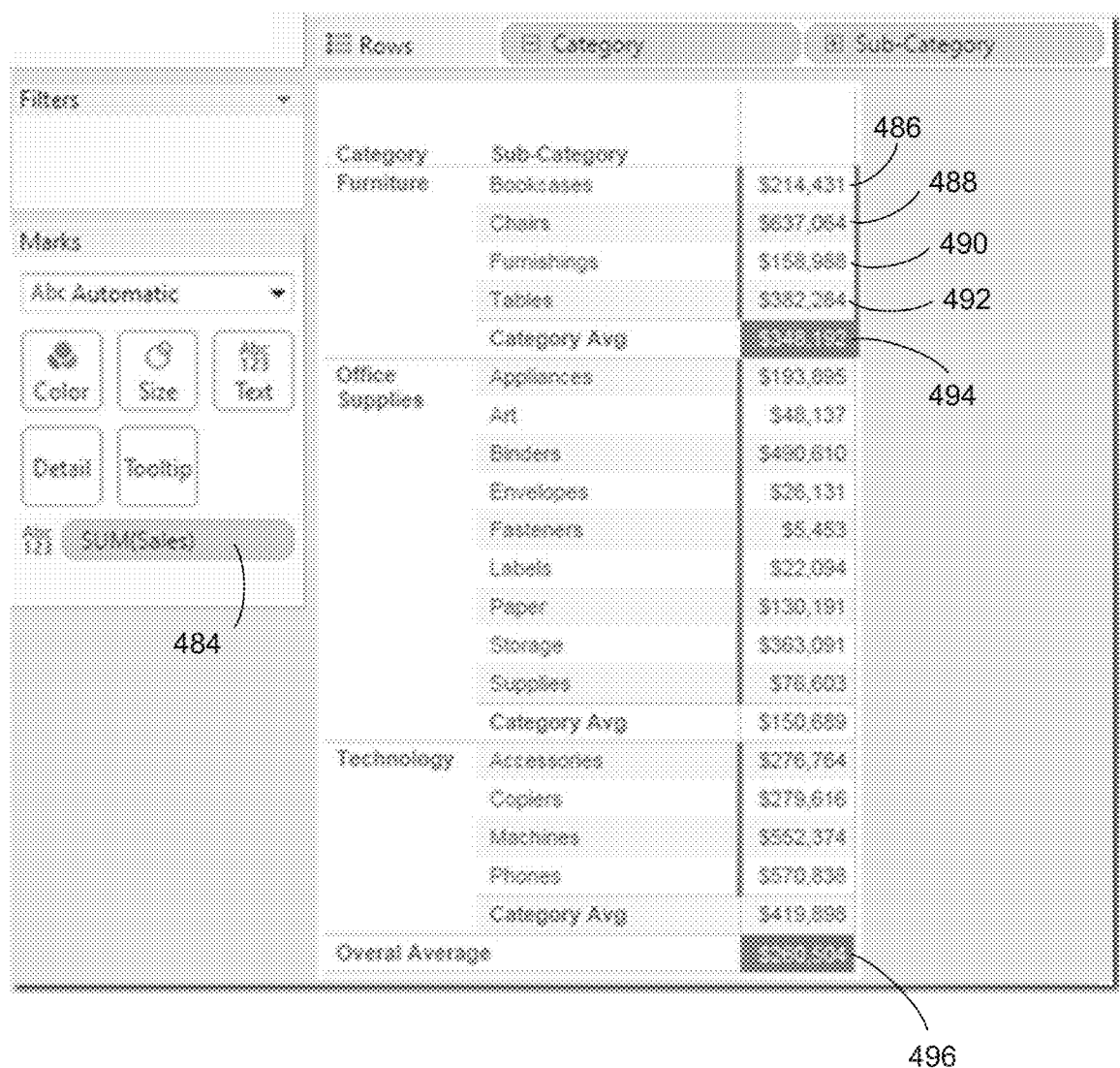

The example in FIG. 4G has the Total Using property set to AVG. The individual marks show a sum of sales as specified by the text property 484. Therefore, the subtotals show the AVG of SUM of sales per Sub-category within each Category. For example, the furniture subtotal (category average) 494 is computed as the average of the sales 486, 488, 490, and 492 for the sub-categories in the furniture category The Grand Total (overall average) 496 shows the AVG of all the rows.

Now that basic totals have been described, it is useful to describe how totals and level of detail expressions work together in some implementations. Even though a single pass grand total applies the aggregation at table granularity (i.e. as if no dimensions were in the table) this does not affect what happens inside an LOD expression (e.g., inside an expression delineated with curly braces { }).

For example, consider a data visualization that in some way uses the dimension [Product Category]. Suppose the user has created the following calculation, which includes an LOD expression: AVG({include [Customer Name] : SUM([Sales])}). Assume that this expression is being used as text encoding, similar to the text encoding 450 in FIG. 4F and the text encoding 484 in FIG. 4G. The embedded LOD expression {include [Customer Name] : SUM([Sales])} computes aggregate values at the [Customer Name], [Product Category] level, regardless of whether the values are being averaged for a single mark or for the grand total. The row calculation for the grand total only changes how the outer aggregate behaves (the AVG in this case). The results of the inner LOD calculation will be averaged up to [Product Category] for each mark in the Sheet, and will be averaged up to table level (a single value) for the grand total.

Single-pass totals are not affected by the replication that is triggered by LOD expressions that are coarser than the Sheet. However, visual totals (two-pass) are affected.

A fundamental feature of LOD expressions is that there can be an unlimited number of the expressions at various levels of detail and nested in various ways. In particular, several layers of level of detail calculations can be nested to answer even more elaborate business questions. Note that the context for a nested LOD calculation is defined by its parent(s) as opposed to the sheet. For example, the calculation {fixed [State] : AVG({include [Customer] : SUM([Sales])})} has the same effect as {fixed [State] : AVG({fixed [State], [Customer] : SUM([Sales])})}because the nested calculation inherits the dimensionality from the outer calculation in the first case. The "include" from the inner LOD expression in the first case brings in the [State] field from the outer LOD expression, creating a dimensionality of [State], [Customer], which is the same as the second case. Also, because the outer calculation is fixed, the nested calculation will not be affected by the filters in the sheet.

Figure 4H:
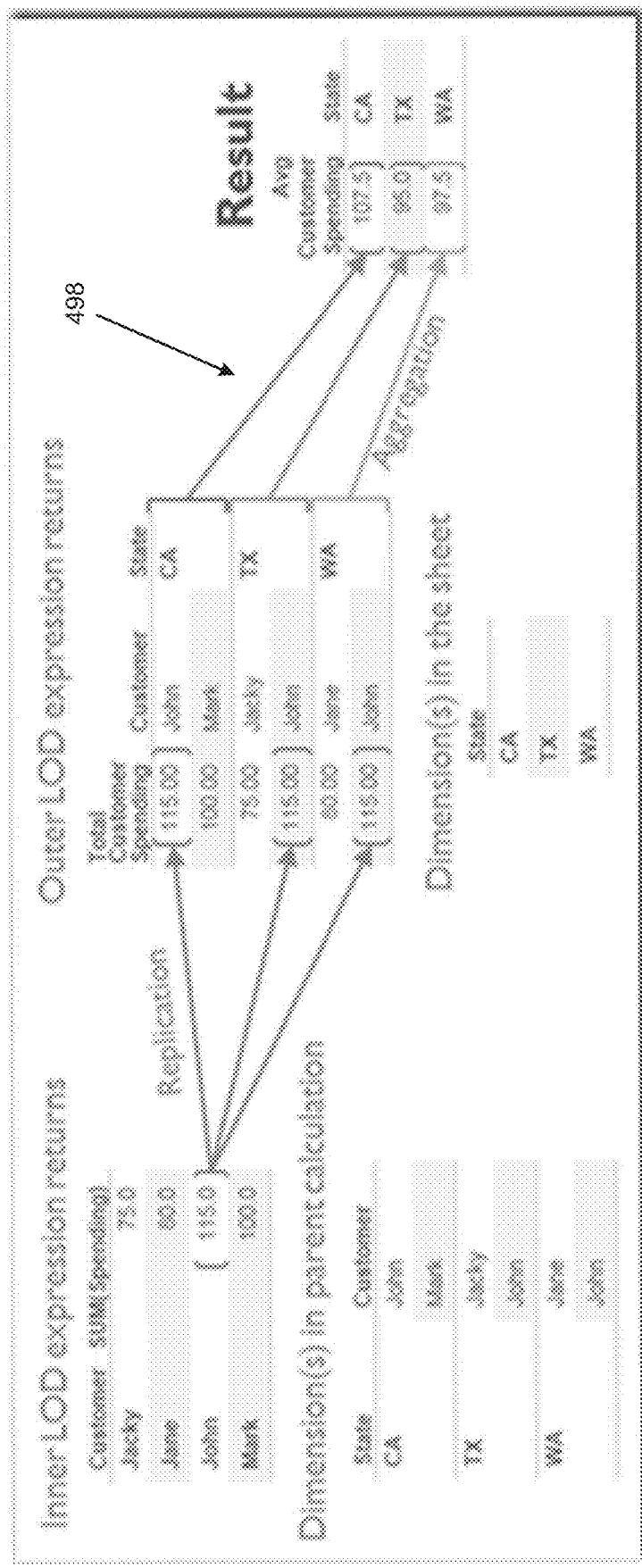

Now consider a scenario where an analyst is trying to calculate the average customer spending in each state, and realizes that customers travelling and spending small amounts in multiple states are skewing the results. Instead of filtering out that spending, the analyst decides to calculate the total spending for each customer and use that value in each state average for which the customer spends money. The calculation {fixed [State], [Customer] : AVG({exclude [State] : SUM([Spending])})} is one way to achieve the desired result, as illustrated in FIG. 4H. The inner LOD expression computes the SUM(Spending) for each customer, and the outer LOD expression computes the average spending per customer per state. Here, the outer aggregation operator doesn't really matter because there will be only one record from the inner aggregation for each outer aggregation. For example, SUM, MIN, or MAX for the outer LOD expression would yield the same result.

The entire expression is then included (498) in an average. At the sheet level, the level of detail is State, so the average spending per customer in each state is computed. In some implementations, a pill containing the expression has its aggregation set to AVG when a user drags it into the sheet.

In the Example of FIG. 4H, customer John has spending in California, Texas, and Washington. His total spending is computed (for all of these states), and that total spending for John is then used in computing the average spending for these three states.

Figure 4I:
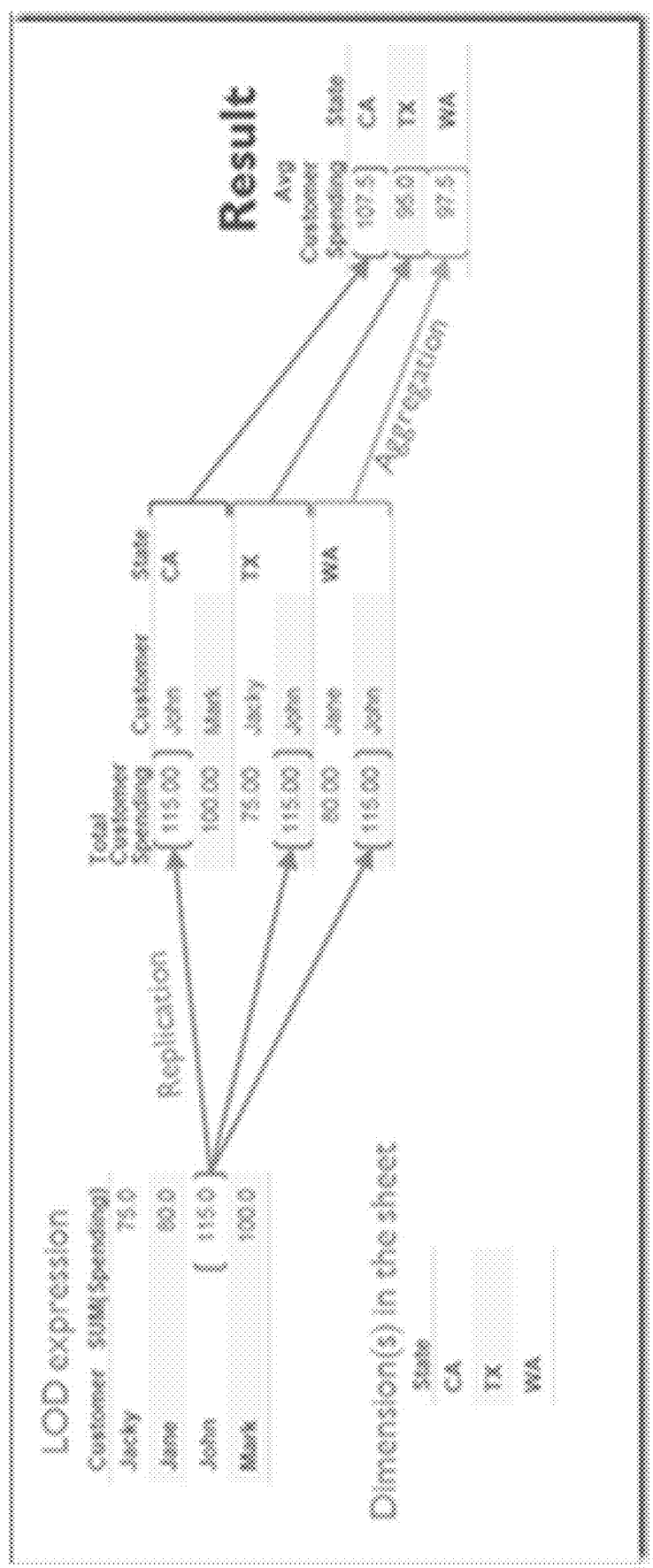

Although this example in relation to FIG. 4H is a good example for explaining how nesting works, there is a simpler way of writing this calculation, as illustrated in FIG. 4I. For example, the LOD expression {fixed [Customer] : SUM([Spending])} computes the total spending for each customer. Assume the [State] dimension field is used somewhere in the sheet (e.g., on the rows shelf or on the columns shelf). Place a pill with the LOD expression on the sheet (e.g., as text encoding or on the rows or columns shelf), and set the pill's aggregation to AVG. In some implementations, when an INNER JOIN is generated, it does so between the dimensionality of the level of detail (LOD) expression and dimensionality that is the union of the sheet and the LOD expression's dimensionalities. In this case, the union of dimensionalities is Customer (from the calculation)+State (from the Sheet), which will result in the same replication behavior as in the nested case illustrated in FIG. 4H.

In some implementations, LOD expressions are computed using queries executed at the database (e.g., a database server). Because of this, performance depends heavily on the database engine, the size of the data, what indexes exist, and the complexity and level of nesting. If the dataset is large and the database is fast, level of detail expressions can provide vastly improved performance because the finer detail calculations are performed at the database instead of moving a large dataset over the wire onto a local computing device.

When a level of detail expression computes a floating point result, some implementations disallow using the output as a dimension because floating point arithmetic does not give results that are reliable for equality comparisons. This prevents causing unexpected results from JOINs, which check for equality.

One challenge in data analysis is translating a question that is easy to articulate in spoken language into an answer that is expressed as a data visualization. Sometimes the analysis requires comparing or referencing data at multiple different aggregation levels. The primary focus of the visualization may be at one level but the question may reference another level. For example, an analyst is visualizing sales revenue at a country level on a map, but wants to compare those sales to a global sales number.

As described above, the main visualization aggregation level is referred to as its "level of detail" or LOD. The disclosed LOD expressions go beyond the visualization level of detail. For example, the data in the visualization may be filtered, whereas an LOD expression can access data before it is filtered.

Figure 5D:
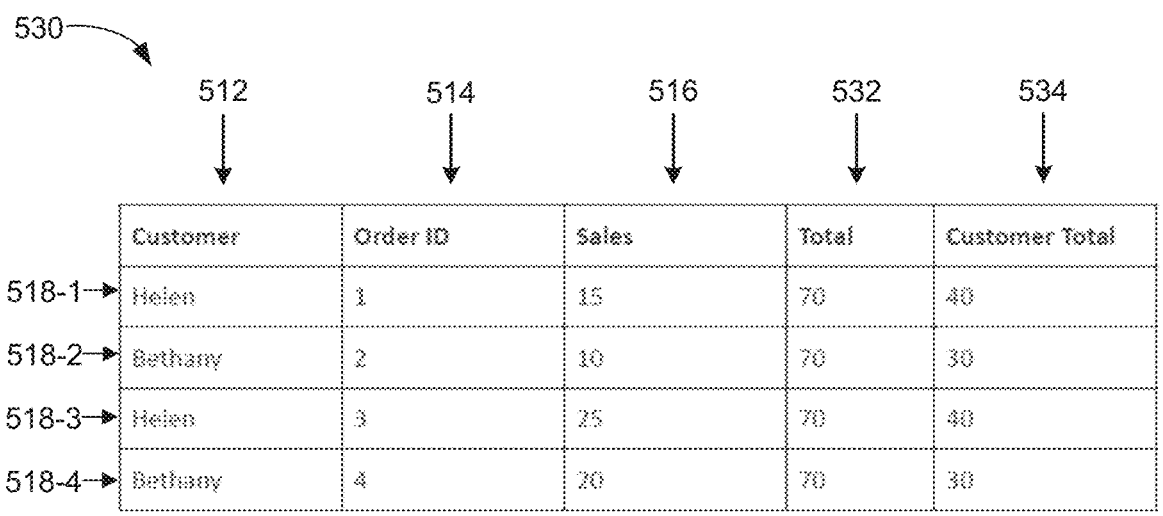
FIGS. 5A-5Q illustrate some aspects of aggregate functions and analytical functions according to some implementations.
Figure 5E:
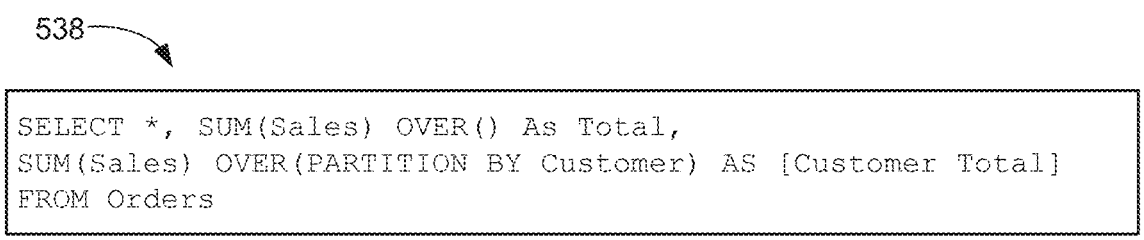
Figure 5H:
Figure 5I:
Figure 5J:
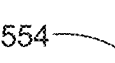
Figures 5O, 5P, 5Q:
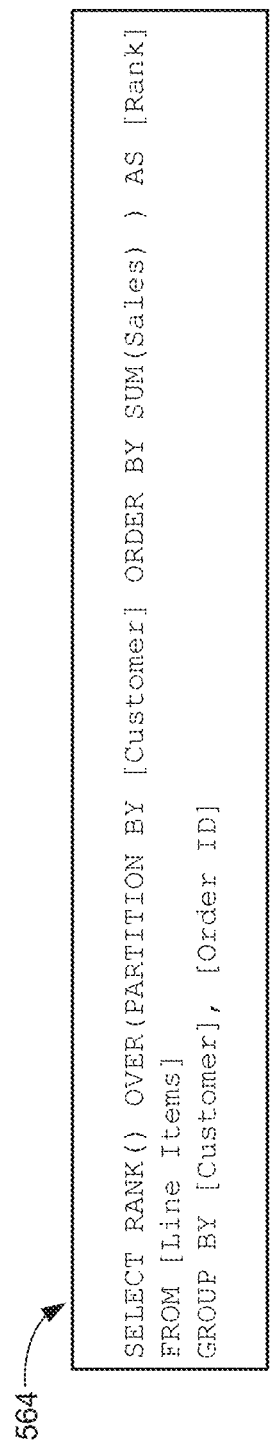

FIGS. 5A-5Q illustrate some aspects of aggregate functions and analytical functions according to some implementations.

Aggregate functions and analytic functions are two major function types that support data visualization. An aggregate function returns a single result for a group of rows. An analytic function computes values over a group of rows and returns a single result for each row. In some implementations, the aggregate functions and the analytical functions are computable using a computer system (e.g., a computing device 200 and/or a server system 300).

FIG. 5A illustrates an exemplary Orders data table 510 describing sales by customer. The data table 510 includes data rows 518-1 to 518-4. The data table 510 includes data columns corresponding to a "Customer" data field 512, an "Order ID" data field 514, and a "Sales" data field 516 In some implementations, the data fields 512, 514, and 516 are a subset of the data fields of a data source 242. In this example, the data table 510 itself has a level of detail determined by "Order" (e.g., Order ID 514), and the data rows 518 are arranged in an ascending order according to the order ID.

FIG. 5B illustrates an aggregated data table 520, which is generated from the Orders data table 510. The aggregated data table 520 includes an aggregated "Sales" data field 522 and whose values are derived by grouping the data rows 518 according to customer and adding (e.g., aggregating) the sales for each customer. In some implementations, using the data table 510 as a starting point, the computing device 200 performs a grouping operation to group the data rows 518 according to respective data values of the "Customer" data field 512. The computing device 200 groups the data rows 518-1 and 518-3, corresponding to the data value "Helen" to form one data row 524-1. The computing device 200 groups the data rows 518-2 and 518-4, corresponding to the data value "Bethany" to form one data row 524-2. The computing device 200 then computes an aggregated "Sales" value 522 for each of the data rows 524, by aggregating (e.g., summing or adding) the sales corresponding to each customer.

FIG. 5C illustrates an exemplary SQL command, which could be used to generate the aggregate table 520 in FIG. 5B.

FIG. 5D illustrates an extended data table 530, which is generated from (e.g., derived from) the Orders data table 510 in FIG. 5A. The extended data table 530 includes data columns for the "Customer" data field 512 the "Order ID" data field 514, and the "Sales" data field 516. The extended data table 530 also includes a "Total" data column 532 and a "Customer Total" data column 534. The "Total" column 532 represents total sales for all four rows of the Orders table 510, and the "Customer Total" column 534 represents total sales by customer. The "Total" column 532 has the same value for all four rows, and the "Customer Total" column 534 shows the same data value for all rows corresponding to the same customer.

The values corresponding to the data column 532 and the data column 534 are computed. Even though a single result is computed for a group of rows, that value is "replicated" or "duplicated" to multiple rows.

FIG. 5E provides an example SQL query to generate the extended table 530 based on the Orders table 510. The query includes an "Over" clause, which defines a window of rows to perform the aggregations. In the example of FIG. 5E, the "Over" clause in the first line "OVER ()As Total" does not specify a window. Consequently, the computing device 200 computes the sum of sales over all of the data rows 518-1 to 518-4, and returns the value "70" for every cell in the "Total" data column 532.

In some instances, the SQL command includes a "Partition By" clause that breaks up the input rows into separate groups, over which the aggregate function is independently evaluated. In the example of FIG. 5E, the second line has the clause "SUM(Sales) OVER(PARTITION BY Customer) AS [Customer Total]". In accordance with this command, the computing device 200 partitions the input rows into separate groups according to customer. The computing device 200 computes the sum of sales for each of the customers, and returns a value for every row according to the customer. FIG. 5D shows that the computing device 200 returns a value of "40" (i.e., 15+25) for the "Customer Total" data field 534 for every data row corresponding to the customer "Helen," and returns a value of "30" (i.e., 10+20) for the "Customer Total" data field 534 for every data row corresponding to the customer "Bethany".

A key difference between the aggregate table 520 in FIG. 5B and the extended table 530 in FIG. 5D is that the extended table 530 has a row for each of the original rows 518 in the Orders table 510. On the other hand, the aggregation of Sales by Customer is the same in both (compare the aggregate Sales 522 in FIG. 5B to the Customer Total 534 in FIG. 5D).

An SQL query can include an "Order By" sub-clause in an "Over" clause. The "Order By" clause defines how rows are ordered within a partition. FIG. 5F illustrates a Running Sum data table 540, in which an "Order By" clause has been added to the query. FIG. 5G shows the query 546, which can be used for computing the values for "Running Sum" 542 and "Customer Running Sum" 544 in the Running Sum table 540.

In the query 546, the "Order By" clause in the expression "SUM (Sales) OVER (ORDER BY [Order ID]) AS [Running Sum]" computes a running sum of sales according to the Order ID field 514. The "Over" clause in the expression "SUM(Sales) OVER(PARTITION BY Customer ORDER BY [Order ID]) AS [Customer Running Sum]" includes both a "Partition By" sub-clause and an "Order By" sub-clause. The "Customer Running Sum" treats each customer as a distinct partition in a sense that the rows corresponding to Helen are treated separately from the rows corresponding to Bethany.

The Running Sum table 540 uses the same partitioning as the extended table 530, but the calculations within each of the partitions is different. For example, the Total field 532 in the extended table 530 does one calculation, and the one calculated value is used for all of the rows in the partition. In the Running Sum table 540, however, each row within a partition has a distinct computed value. In this example, the Running Sum field 542 computes a sum of all rows up to that point based on the ORDER BY sub-clause in the OVER clause. The tables 530 and 540 have the same partitions for the two fields Customer Total 534 and Customer Running Sum 544. There is a first partition for Helen and a second partition for Bethany.

A "running run" is an example of an analytical function because it computes a separate value for each row in a partition.

Although an SQL expert could generate the queries in FIGS. 5C, 5E, and 5G, they are increasingly complex, and beyond what many data analysts could write. Even for an expert, the syntax is non-trivial, and thus subject to error. Furthermore, a data analyst has data sets with many more than four rows (e.g., thousands or millions or rows). When there are many rows, it can be much more difficult to verify the accuracy of the results. The next few examples identify desired data sets, and compare two ways to achieve the results: (1) using a complex SQL query; and (2) using a concise LOD expression that is generated using a graphical user interface. The LOD expressions are much easier to use for a much larger audience of data analysts and data scientists, and the conciseness makes it faster to create and less likely to have errors.

FIG. 5H shows a Line Item data table 550, which has line items within orders. To compute a running sum per customer for the customer's orders, the query must first execute a subquery to aggregate sales at the order level of detail. In some implementations, this can be achieved using an exemplary SQL command 552, as illustrated in FIG. 5I. The SQL command 552 can be verbose and complex because the [Customer] and [Order ID] fields are repeated in the aggregate sub-query and outer query.

The same functionality can be achieved using an LOD expression 554 as illustrated in FIG. 5J. The portion to the right of the colon of the LOD expression 554 (i.e., "Running_Sum (SUM(Sales))") is an analytic expression. In some implementations, the analytic expression includes an analytic function that partitions data rows from the data source into groups and computes a respective distinct value for each row in each group using values from other rows in the respective group.

There are several benefits of using LOD expressions for enabling table calculations. First, the dimensions preceding the colon (e.g., [Customer] and [Order ID]) serve a dual function by simultaneously specifying the GROUP BY for the SUM(Sales) aggregation, and the PARTITION BY and ORDER BY for the Running Sum analytic function. Thus, the LOD expression is much more compact and readable compared to the SQL query 552. Second, the LOD expression 554 can adapt to the data visualization. One LOD expression can adopt multiple different meanings based on the context in which it is used. For example, with an "Include" keyword 410, the dimensions in the data visualization are added as partitioning dimensions. For example, consider the LOD expression 556 with the "Include" keyword in FIG. 5K. The presence of the "Sort" keyword in FIG. 5K indicates that the LOD expression has an analytic function, and the data field following the "Sort" keyword (e.g., [Order ID]) is a dimension. FIG. 5L shows an SQL query 558 for generating the same results as the LOD expression 556 in FIG. 5K. In this example, the equivalent SQL query 558 is more verbose and complex compared to the LOD expression 556.

Another advantage of using LOD expressions for enabling table calculations is that one data field can be used to order another data field. For example, suppose the input table is the Line Item data table 550 of FIG. 5H and a user would like to compute two ranks: (1) Rank Orders for each Customer by Order ID and (2) Rank Orders by Sum(Sales) for each Customer. In some implementations, the first rank operation "Rank Orders for each Customer" can be computed with an SQL query 560 as illustrated in FIG. 5M. In contrast, the equivalent LOD expression 562 is much simpler, as illustrated in FIG. 5N.

In some implementations, the second rank operation "Rank Orders by Sum(Sales) for each Customer," can be computed with a SQL query 564 as illustrated in FIG. 5O. FIG. 5P illustrates an LOD expression 566 that achieves the same results as the SQL query 564 in FIG. 5O. FIG. 5Q illustrates a data table 570 that shows the computed values for the two ranks. The data rows are partitioned by Customer. The Orders Ranked column 572 ranks each customer's orders by Order ID, and the "Orders Ranked by Sum (Sales)" column 574 ranks the orders by Sales. Each of the customers in this example had a higher Sales amount on her second order.

In some implementations, as illustrated in FIG. 5P, an LOD expression can include a "By" keyword. While the ORDER BY in a SQL command can be a measure or a dimension, the LOD expression 566 requires that SORT fields are dimensions and the BY field is a measure. If no BY keyword is present in an LOD expression, the set of dimensions following the SORT keyword translates to an SQL ORDER BY. If the BY keyword is present in the LOD expression, the measure following the BY keyword translates to an SQL ORDER BY, and the SORT dimensions are added to the GROUP BY clause. Thus, by treating measures and dimensions differently, the LOD expression can merge the concepts of aggregation and analytic functions into a single concise expression, and remove the redundancy that occurs in SQL.

Figure 6A:
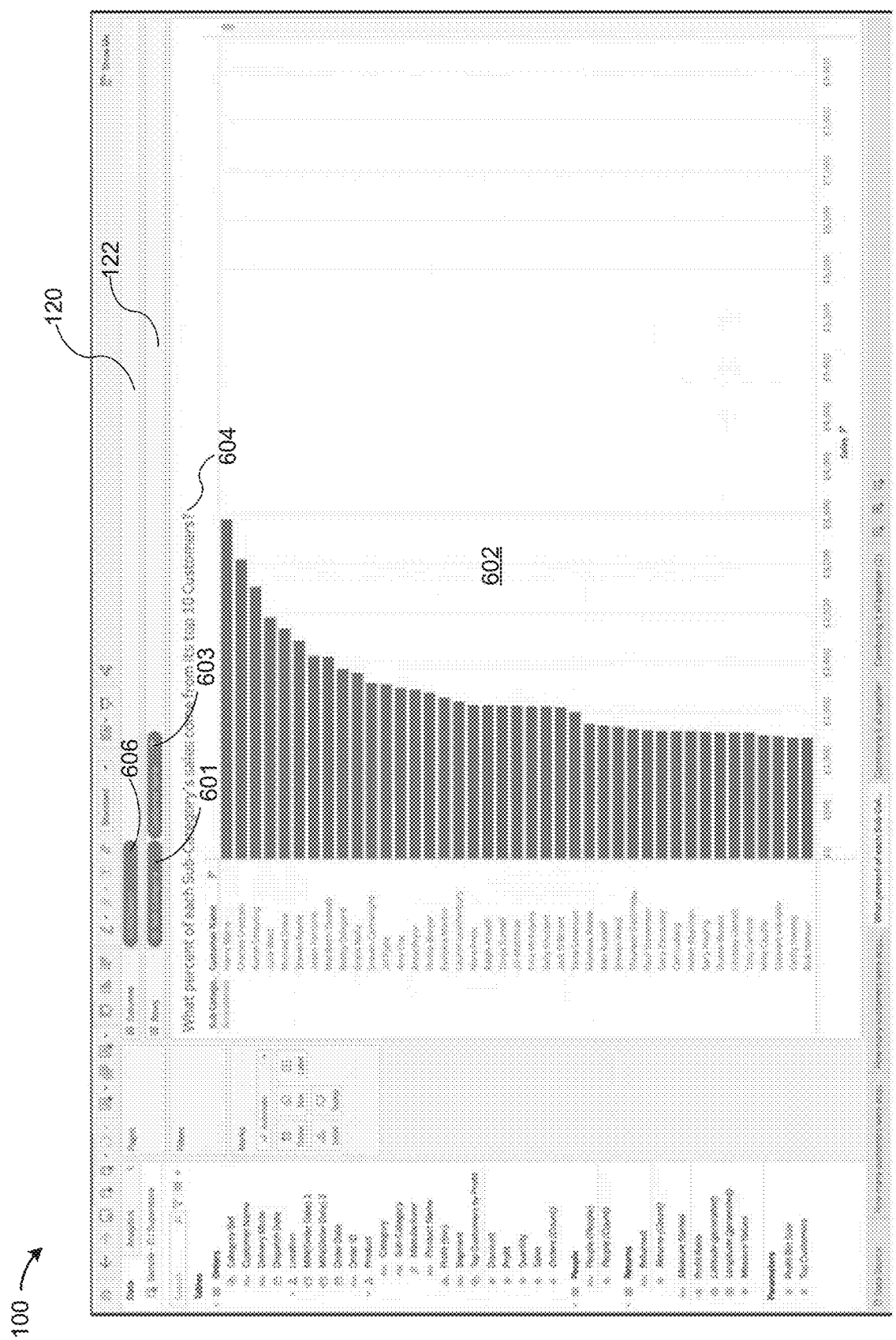
FIGS. 6A-6N provide a series of screen shots for computing multi-step calculations and generating LOD expressions via a graphical user interface, according to some implementations.

A lot of calculations require computing data at multiple different levels of detail (LOD). In accordance with some implementations of the present disclosure, a computing device 200 (or a data visualization server 300) includes a data visualization application 230 that incrementally builds (e.g., generates) multi-pass aggregations through data visualizations. In some implementations, the computing device 200 (e.g., the data visualization application 230) generates LOD expressions corresponding to the data visualizations. FIGS. 6A-6N are illustrative.

FIGS. 6A-6N provide a series of screen shots for computing multi-step calculations and generating LOD expressions via a graphical user interface, according to some implementations.

In the example of FIG. 6A, the graphical user interface 100 displays a data visualization 602 (e.g., a horizontal bar chart) with "sales" (e.g., sum of sales) on the horizontal axis, and category fields (e.g., dimensions) "sub-category" and "customer name" on the vertical axis. In some implementations, the data visualization 602 is generated by placing (e.g., via a drag-and-drop operation) the "Sub-Category" pill 601 and the "Customer Name" pill 603 on the rows shelf 122, and placing the "Sales" pill 606 on the columns shelf 120, which by default is aggregated to SUM(Sales). Each data bar of the bar chart 602 represents a respective customer (e.g., customer name) for a particular sub-category. The length of the data bar represents, and is proportional to, the amount of sales for the customer for the sub-category. In the bar chart 602, the data bars are arranged in a descending order according to the amount of sales. In some implementations, the data bars can be arranged in descending order according to sales, or in an alphabetical order (e.g., ascending or descending) according to customer name.

In FIG. 6A, the graphical user interface 100 displays an exemplary business question 604 "What percent of each sub-Category's sales come from its top 10 customers?" Although this may be a simple question to ask, it is very difficult to answer. (Try to write a single SQL query to compute this!) To answer the business question 604 would require a comparison of multiple levels of detail (e.g., sub-category and customers) in a ratio calculation. One approach includes a multi-step process of: (i) computing the sales at the level of detail of sub-category and customer, (ii) ranking the computed sales to determine the top ten sales for each sub-category by customer name, (iii) aggregating the sales for the top ten customers for each sub-category, (iv) aggregating the sales for all the customers for each sub-category to determine total sales for each sub-category, and (v) dividing the aggregated top ten sales by the total sales. FIGS. 6B to 6N illustrate how the graphical user interface 100 and LOD expressions can be used to generate multi-step calculations to solve the business question 604.

Figure 6B:
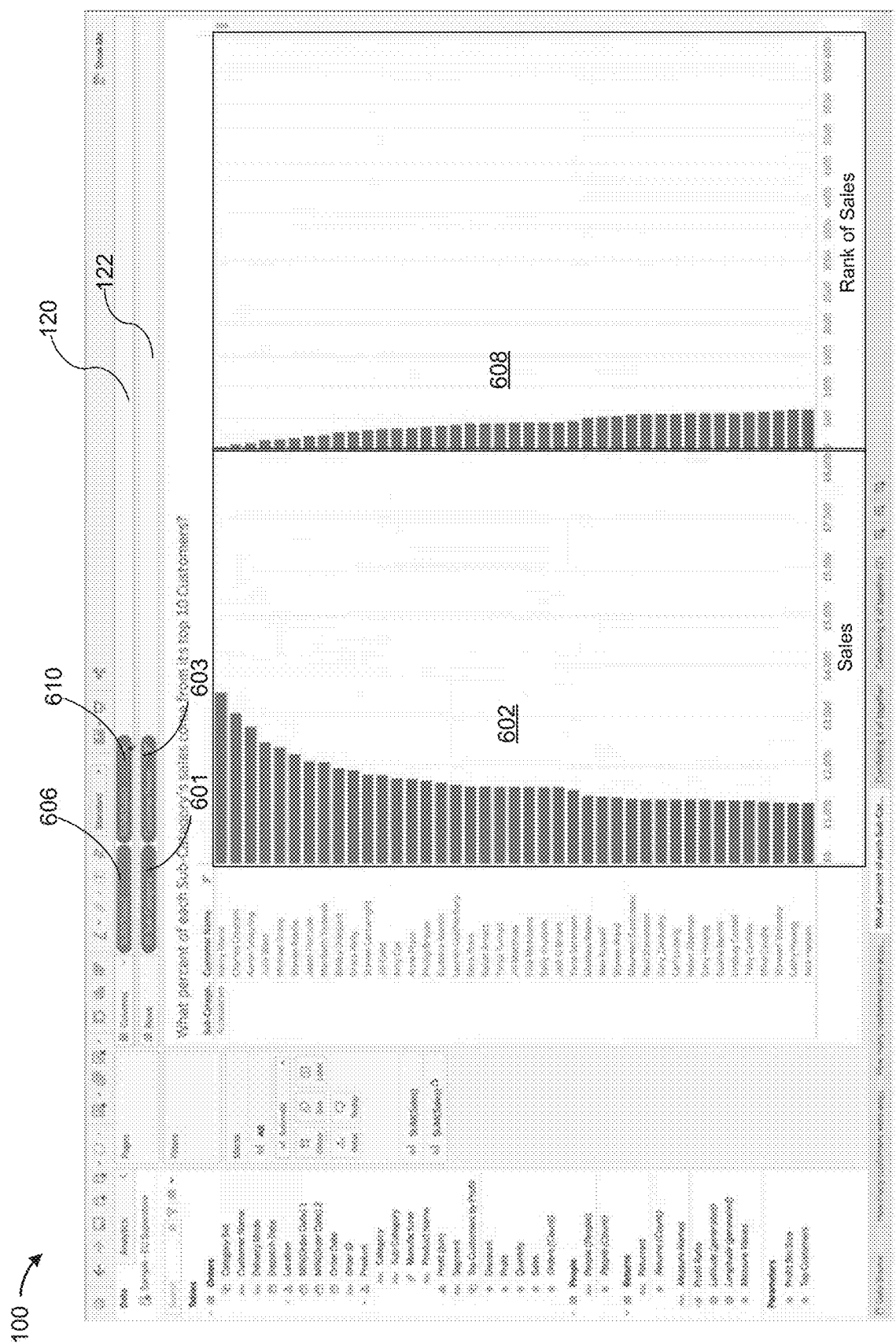

FIG. 6B illustrates the graphical user interface 100 displaying a second data visualization 608 concurrently with the first data visualization 602. In this example, the second data visualization 608 is a horizontal bar chart with "Rank of Sales" on the horizontal axis, and "sub-category" and "customer name" on the vertical axis. The data visualization 608 has the same vertical axis as the first data visualization 602, as defined by the "Sub-Category" pill 601 and the "Customer Name" pill 603 on the rows shelf 122. In some implementations, the values for the rank (e.g., the length of the data bars in the second data visualization 608) are generated in accordance with user input to replicate the "SUM(Sales)" pill 606 in the columns shelf 120 as the "SUM(Sales)" pill 610, followed by user selection of a "Rank" aggregation type for the pill 610.

Figure 6C:
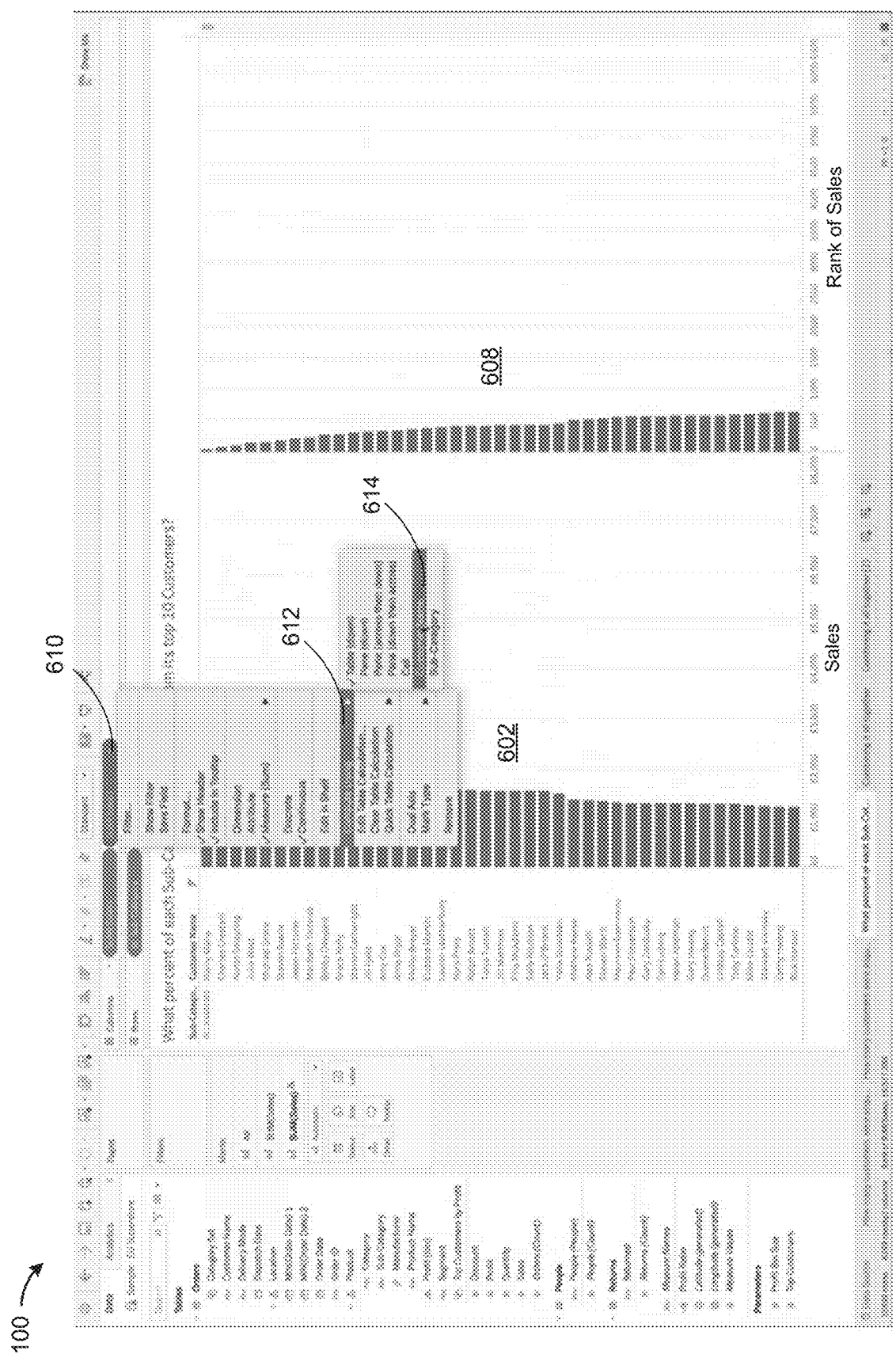

FIG. 6C illustrates user selection to "Compute [the Rank calculation] Using" (612) and "Customer Name" (614), for the "SUM(Sales)" pill 610.

Figure 6D:
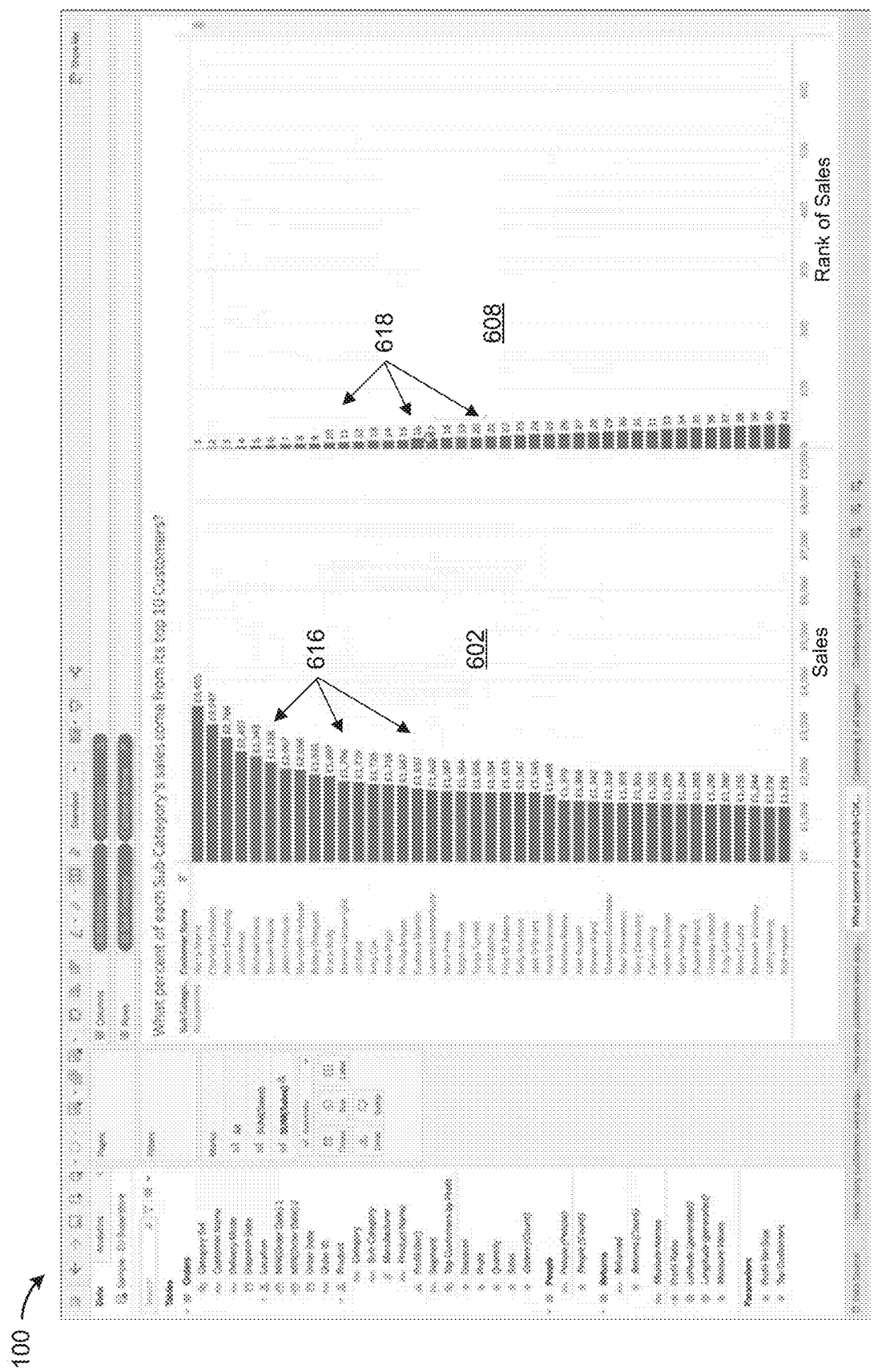

In response to the user selection in FIG. 6C, FIG. 6D illustrates the computing device 200 computing the sales by customer and sub-category. The computing device 200 generates (e.g., updates) the first data visualization 602 to include the corresponding sales amount 616 (e.g., a numeric value having units of currency) for each of the data bars of the data visualization 602. The computing device 200 also computes a rank of sales by customer name and sub-category, and displays the corresponding rank 618 for each of the data bars in the second data visualization 608.

Figure 6E:
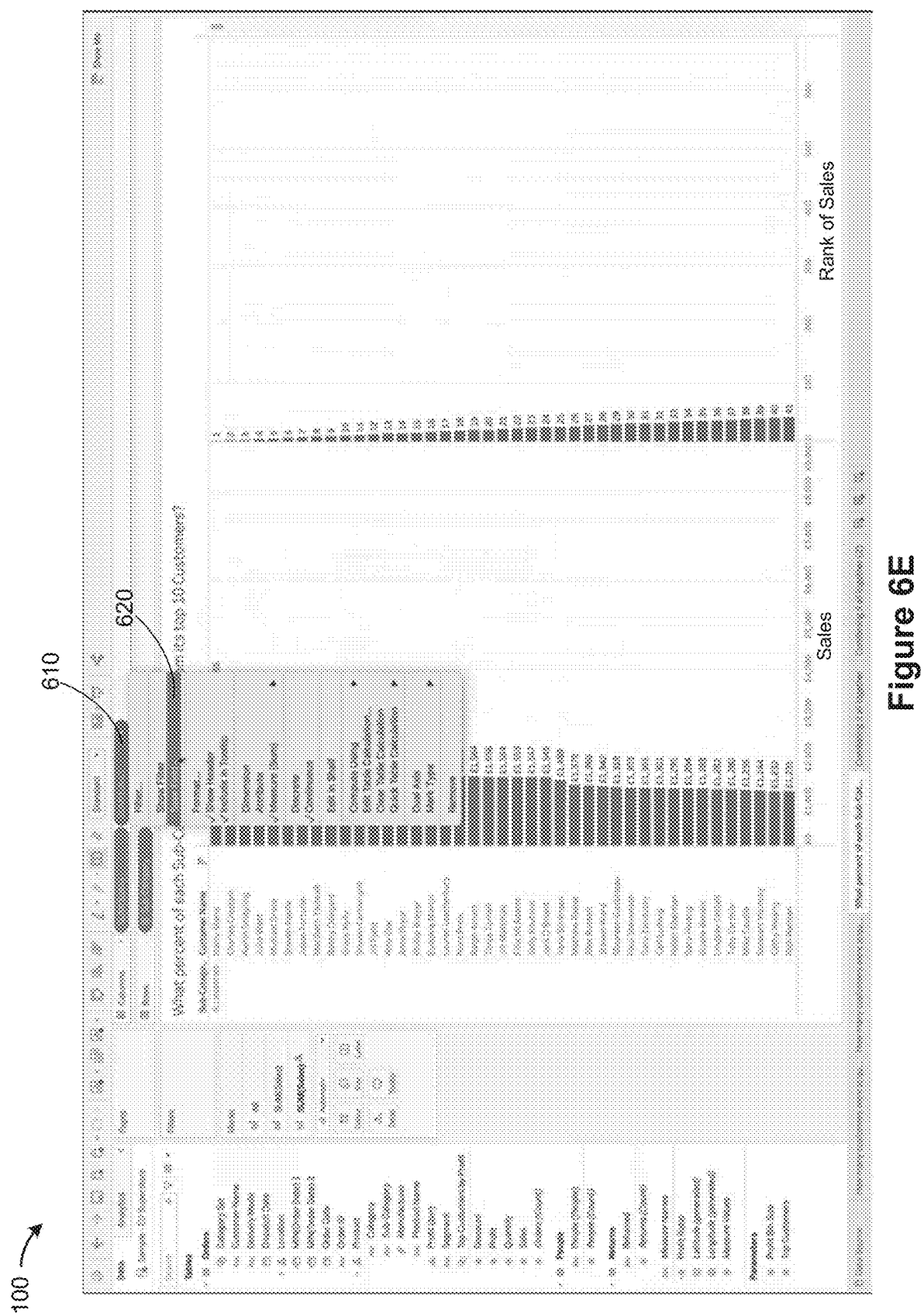

FIG. 6E illustrates user selection of the "Save Field" option 620 for the pill 610, to save the rank calculation.

Figure 6F:
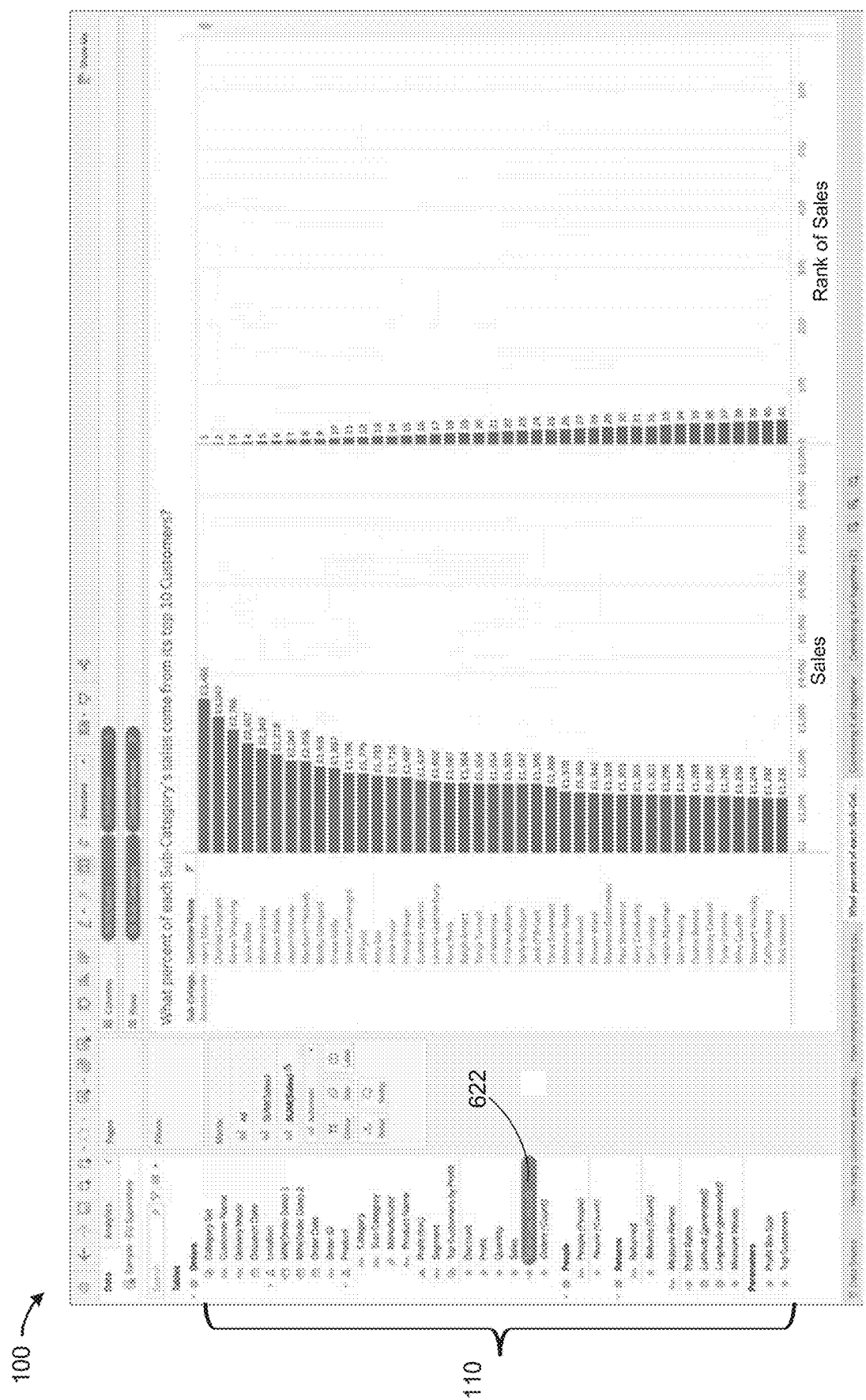

In response to the user selection, FIG. 6F illustrates the computing device 200 generating a new data field 622 for the rank calculation. The graphical user interface 100 displays a field name "Table Calc as LOD", corresponding to the new data field 622, in the schema information region 110.

Figure 6G:
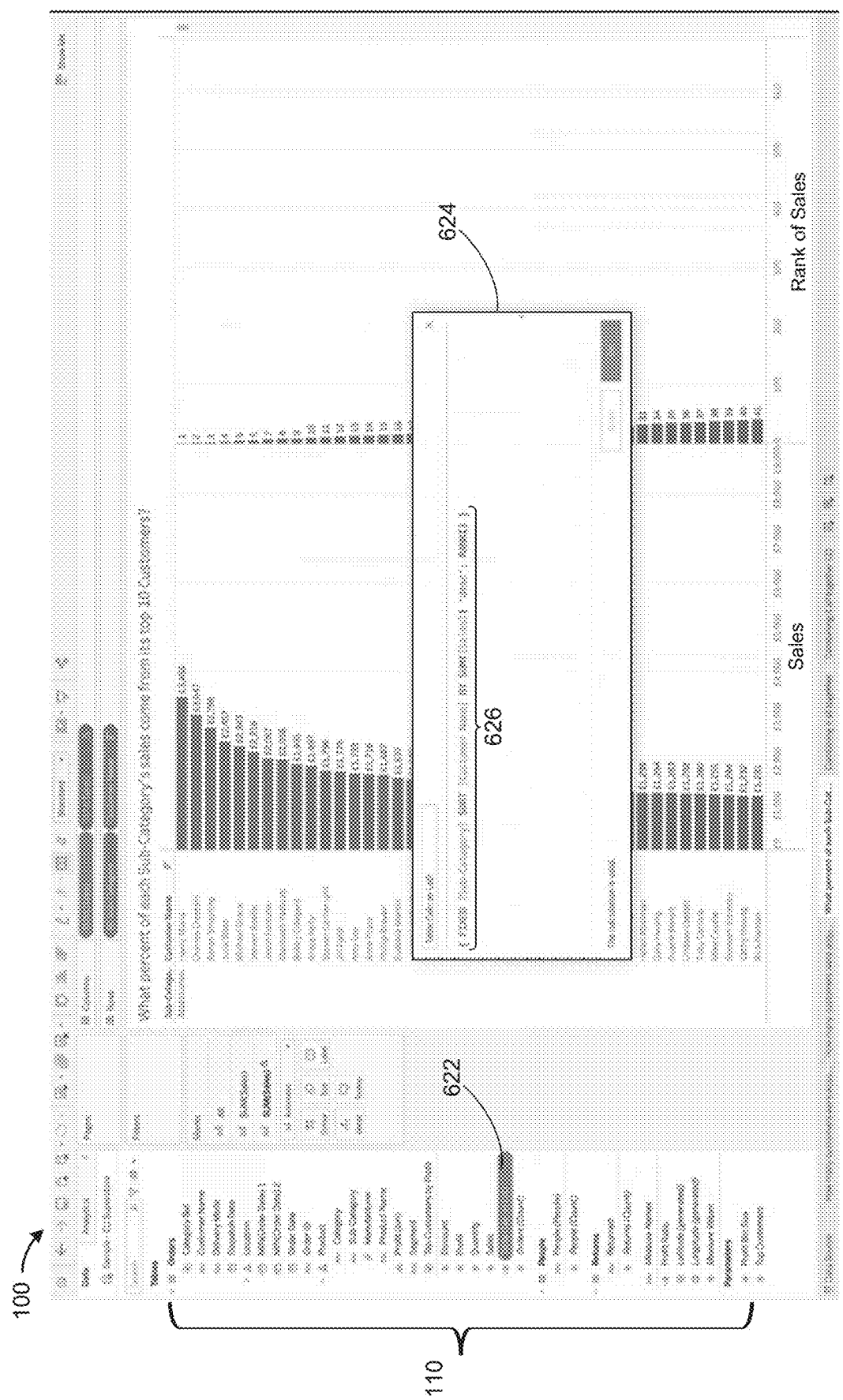

FIG. 6G illustrates a user interaction with the data field 622 "Table Calc as LOD". In this example, the user right-clicks on the field name corresponding to the data field 622. In response to the user interaction, the graphical user interface 100 displays a window 624 that shows an LOD expression 626 for the rank calculation. The LOD expression 626 was generated by the computing device 200. In this example, the LOD expression 626 has the form "{ FIXED [Sub-Category] SORT [Customer Name] BY SUM ([Sales]) 'desc': RANK ()}". The LOD expression 626 includes a "Sort" keyword and a "By" keyword to account for the addressing and partitioning fields for a table calculation. Note that the LOD expression 626 was generated automatically by the data visualization application based on simple user inputs. In addition, the calculation is now saved as a data element 622, which can be used in other data visualizations.

Figure 6H:
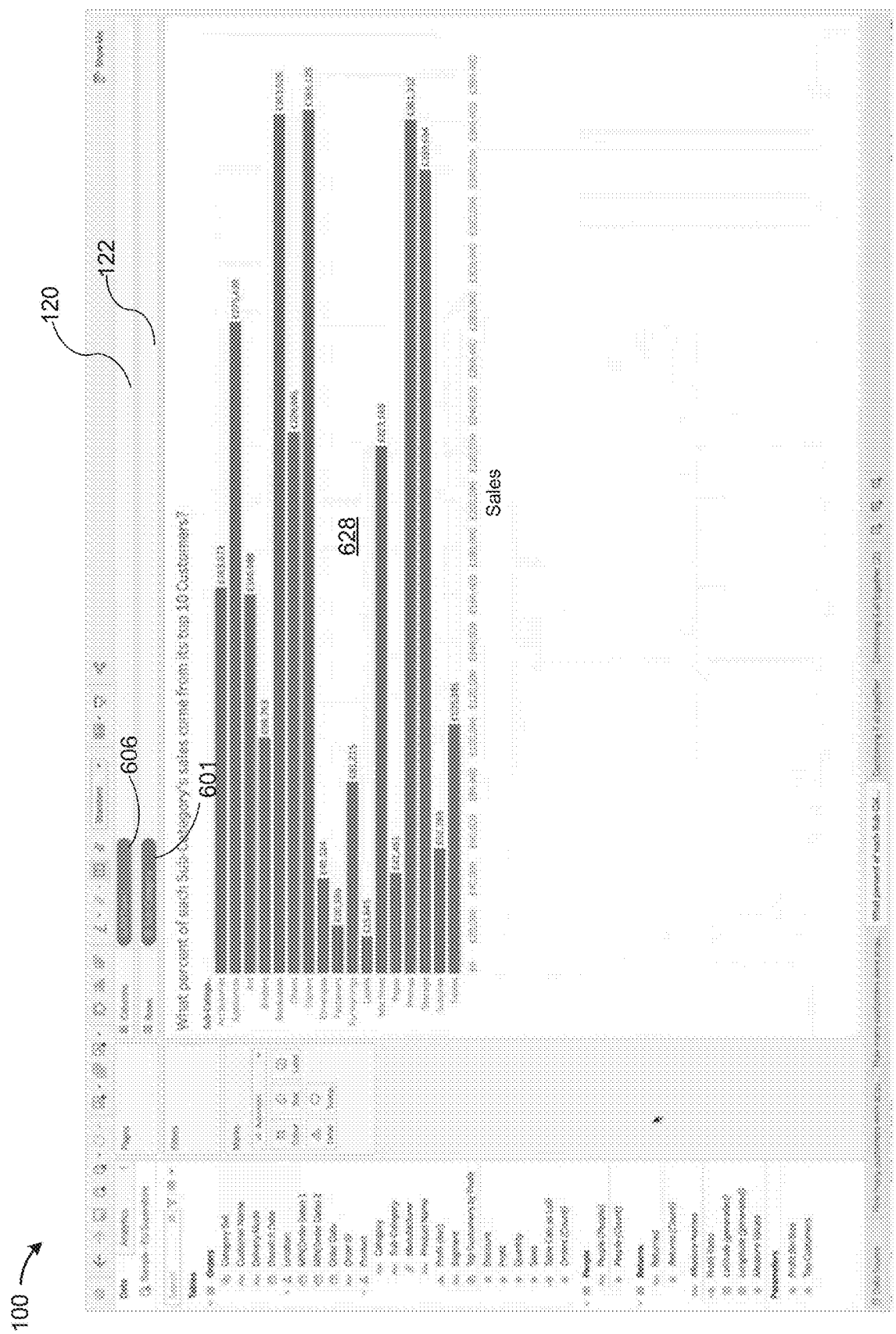

FIG. 6H shows that the user has created a third data visualization 628. The data element 622 that was previously created is available in the schema information region. The data visualization 628 is a horizontal bar chart with "Sub-Category" on the vertical axis and "Sales" on the horizontal axis. Each data bar of the bar chart 628 represents a data value of the data field "Sub-category." The length of the data bar represents the aggregated sales for all customers for the respective sub-category. In some implementations, the data visualization 628 is generated by placing the "Sub-Category" pill 601 on the rows shelf 122 and placing the "Sales" pill 606 in the columns shelf 120, which by default is aggregated to SUM(Sales).

Figure 6I:
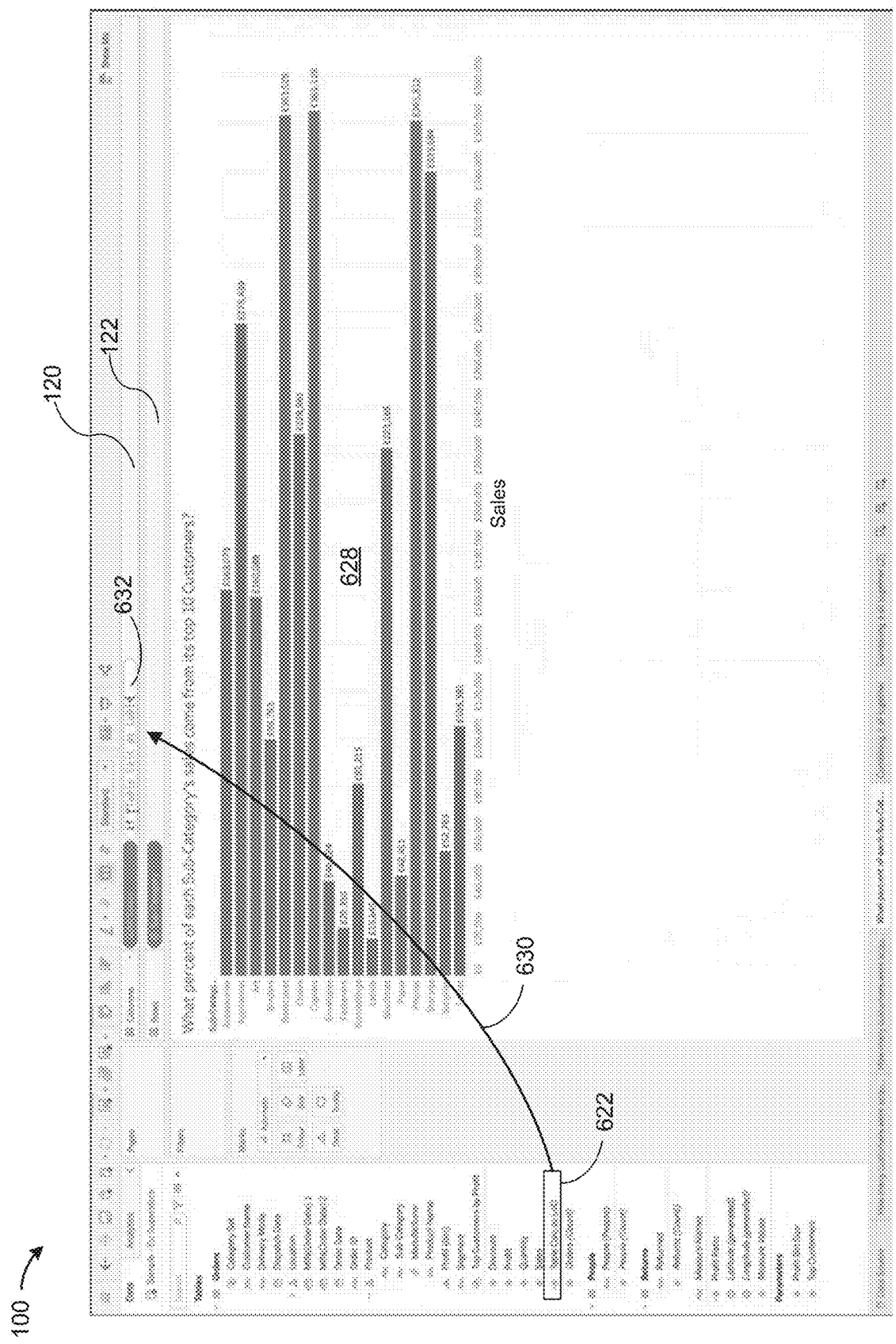

FIG. 6I illustrates a drag-and-drop operation (630) by a user, to place the field 622 "Table Calc as LOD" on the columns shelf 120. The element 632 in FIG. 6I denotes the "Table Calc as LOD" pill in the columns shelf 120.

Figure 6J:

FIG. 6J illustrates user modification of the "Table Calc as LOD" pill 632. In this example, the user inputs additional commands "If (Table Calc as LOD) <=10 then [Sales] END". Since the (Table Calc as LOD) corresponds to the data field for the rank calculation as described in FIGS. 6C to 6E, the user command is equivalent to a command "if the rank of the customers is less than or equal to 10, then return the sum of sales." The modified pill is denoted as pill 634.

Figure 6K:
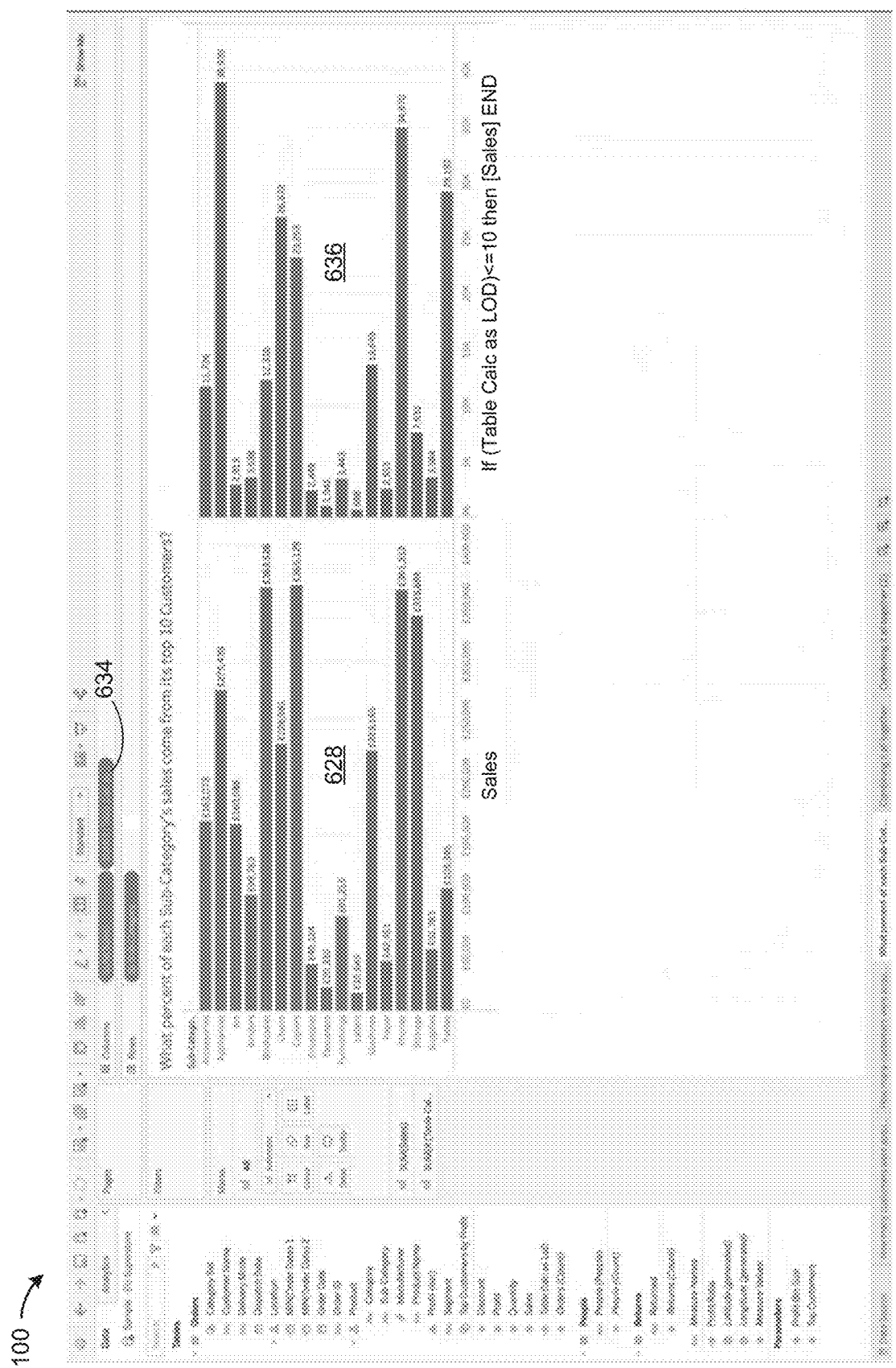

In response to the user input, FIG. 6K illustrates the computing device 200 computing aggregated sales for the top ten customers for each sub-category. The computing device 200 generates a fourth horizontal bar chart 636 having vertical axis "Sub-category" and horizontal axis "If (Table Calc as LOD)<=10 then [Sales] END." The computing device 200 displays the bar chart 636 on the graphical user interface 100, adjacent to the third data visualization 628.

Figure 6L:
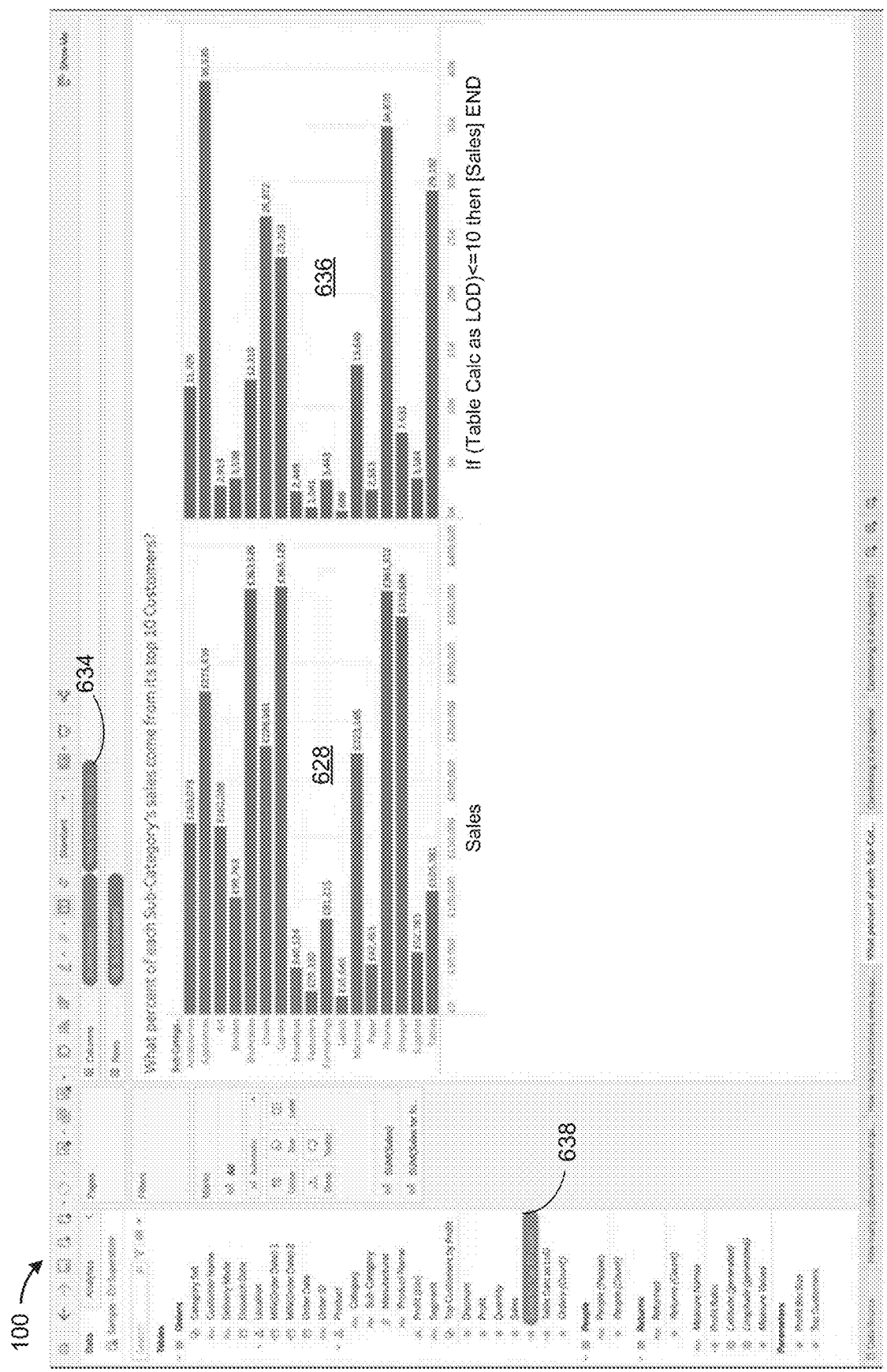

FIG. 6L illustrates a user input to save the calculation "If (Table Calc as LOD)<=10 then [Sales] END" that is used to generate the bar chart 636. In response to the user input, the computing device 200 generates a new data field 638 for the calculation. The graphical user interface 100 displays a field name "Sales for top 10 customers", corresponding to the new data field 638, in the schema information region 110.

Figure 6M:
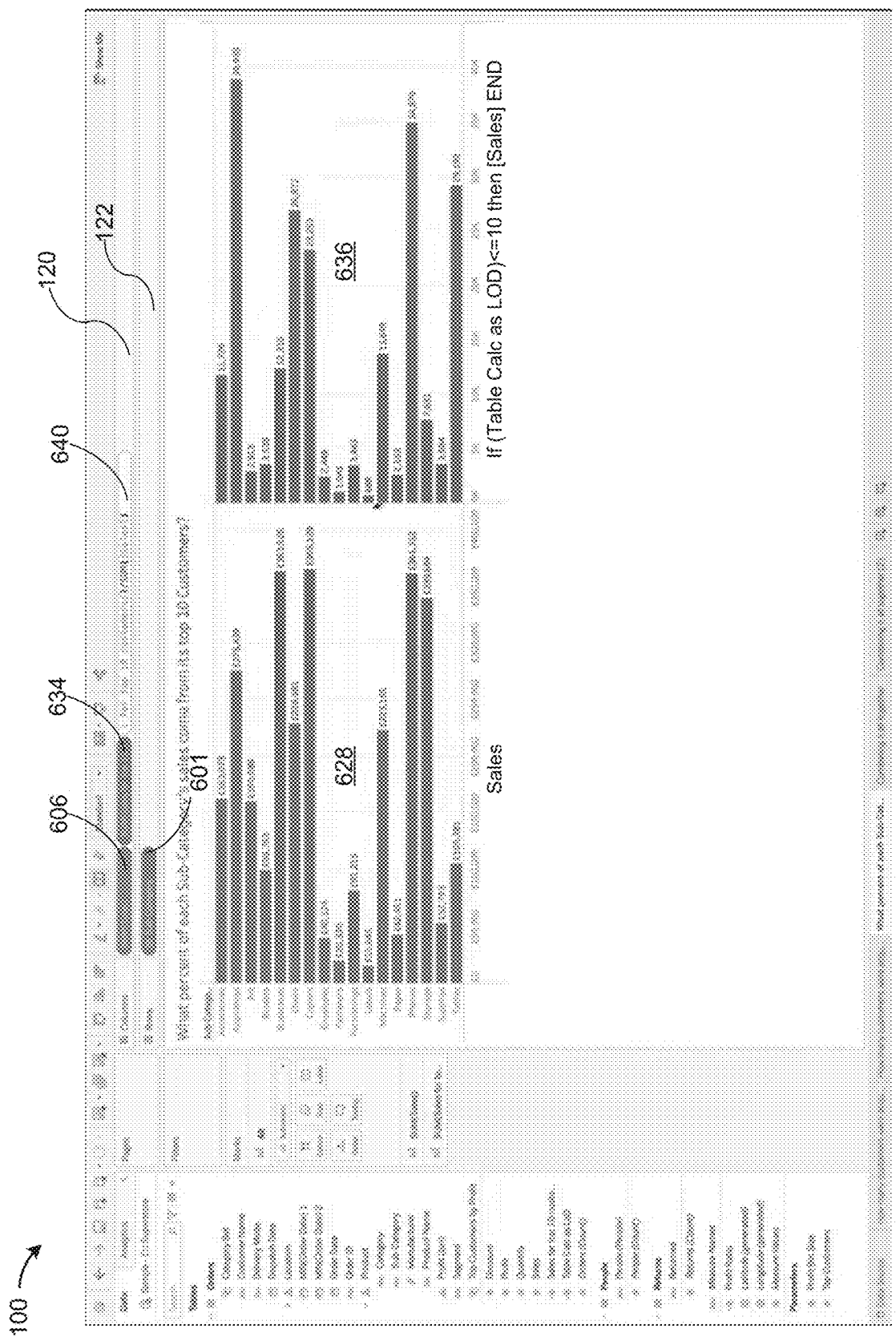
Figure 6N:
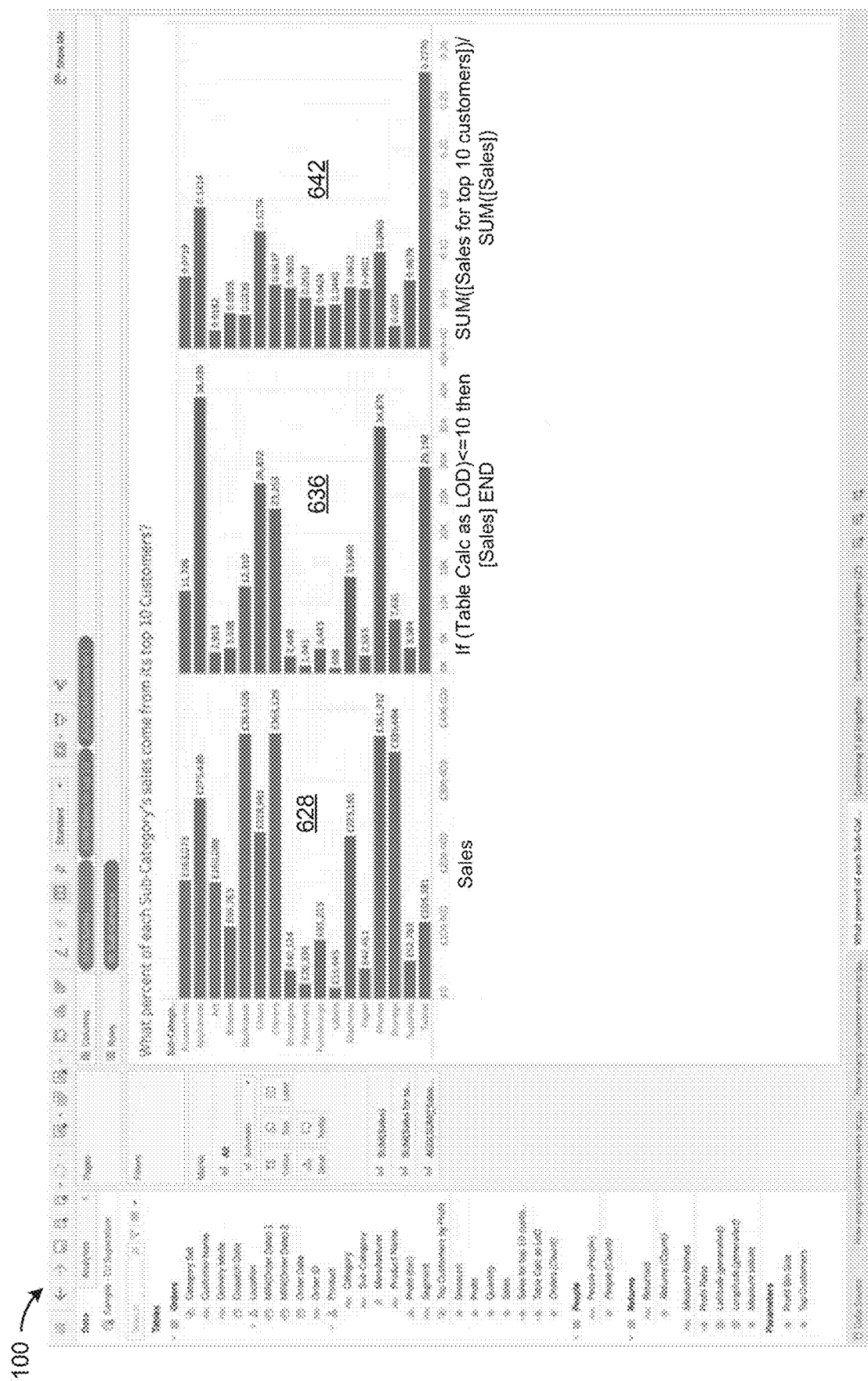

FIG. 6M illustrates user placement of a pill 640 in the columns shelf 120. The pill 640 corresponds to a division operation to divide SUM([Sales for top 10 customers]) by SUM([Sales]).

In response to placement of the pill 640, FIG. 6N illustrates the computing device 200 performing a division operation to divide (i) aggregated sales for top 10 customers by (ii) total sales for all customers, for each of the sub-categories. The results of the division is displayed as a final data visualization 642.

FIGS. 6A-6N illustrate building a sequence of LOD expressions, and also illustrate how generating a calculation from one data visualization can be saved and used for a subsequent data visualization. These figures also illustrate the power of an LOD expression: with a FIXED dimensionality expression, the LOD expression produces the same results regardless of the context in which it is used (and an user can switch to an INCLUDE or EXCLUDE dimensionality expression when the context is intended to change the calculation).

FIGS. 7A-7E provide a flowchart of a method 700 according to some implementations. The method 700 is also called a process.

The method 700 is performed (702) at a computing device 200 that has a that has a display 212, one or more processors 202, and memory 206. The memory 206 stores (704) one or more programs configured for execution by the one or more processors 202. In some implementations, the operations shown in FIGS. 4A to 4I, FIGS. 5A to 5Q, and FIGS. 6A to 6N correspond to instructions stored in the memory 206 or other non-transitory computer-readable storage medium. The computer-readable storage medium may include a magnetic or optical disk storage device, solid state storage devices such as Flash memory, or other non-volatile memory device or devices. The instructions stored on the computer-readable storage medium may include one or more of: source code, assembly language code, object code, or other instruction format that is interpreted by one or more processors. Some operations in the method 700 may be combined and/or the order of some operations may be changed.

The computing device 200 receives (706) user selection of a data source 242. Generally, the data source 242 includes (738) a data table that has multiple rows.

The computing device 200 receives (708) user input to specify a level of detail (LOD) expression (e.g., the LOD expression 554 in FIG. 5J, the LOD expression 556 in FIG. 5K, or the LOD expression 562 in FIG. 5N). For example, the user may specify an LOD expression via a command box (e.g., a natural language input box 124) or a text editor that is included with the computing device 200. In some implementations, the user may specify the LOD expression using the graphical user interface 100. The LOD expression includes (708) a first keyword, a SORT keyword, and an analytic expression.

The first keyword specifies or defines (710) how a dimensionality expression corresponding to the first keyword is used in the LOD expression. In some implementations, the first keyword is (712) FIXED, INCLUDE, or EXCLUDE.

The analytic expression includes (714) an analytic function that partitions data rows from the data source into groups and computes a respective distinct value for each row in a respective group using values from other rows in the respective group. In some implementations, the analytic function is (716) RUNNING_SUM, RUNNING_AVERAGE, RUNNING_COUNT, RUNNING_MAX, RUNNING_MIN, RANK, RANK_DENSE, RANK_MODIFIED, RANK_PERCENTILE, RANK_UNIQUE, or LOOKUP. In some implementations, the analytic function is FIRST, INDEX, LAST, LOOKUP, MODEL_PERCENTILE, MODEL_QUANTILE, PREVIOUS_VALUE, TOTAL, WINDOW_AVG, WINDOW_CORR, WINDOW_COUNT, WINDOW_COVARP, WINDOW_MEDIAN, WINDOW_MAX, WINDOW_MIN, WINDOW_PERCENTILE, WINDOW_STEDEV, WINDOW_STEDEVP, WINDOW_SUM, WINDOW_VAR, or WINDOW_VARP.

Figure 7A:
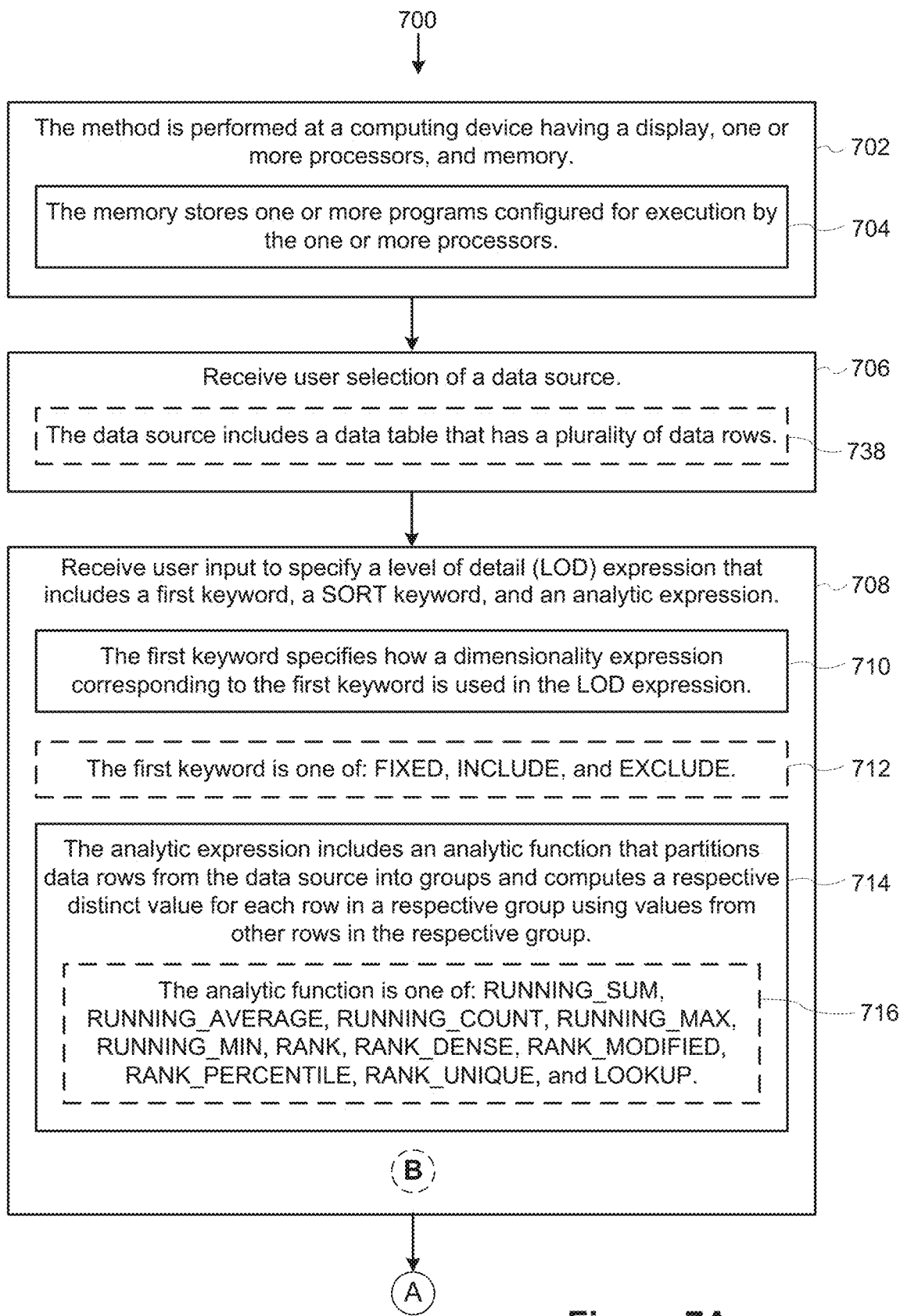
Figure 7B:
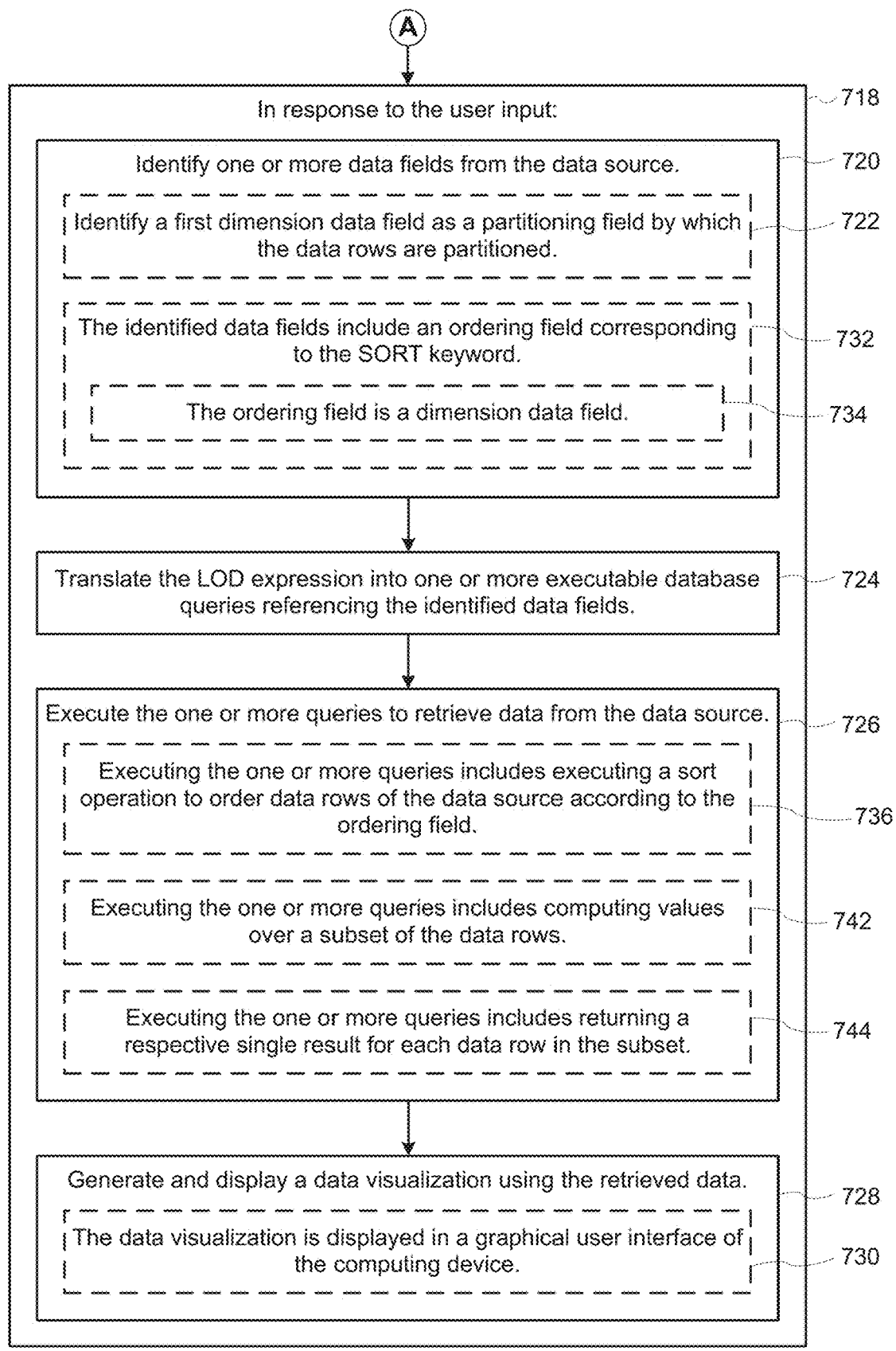
Figure 7C:
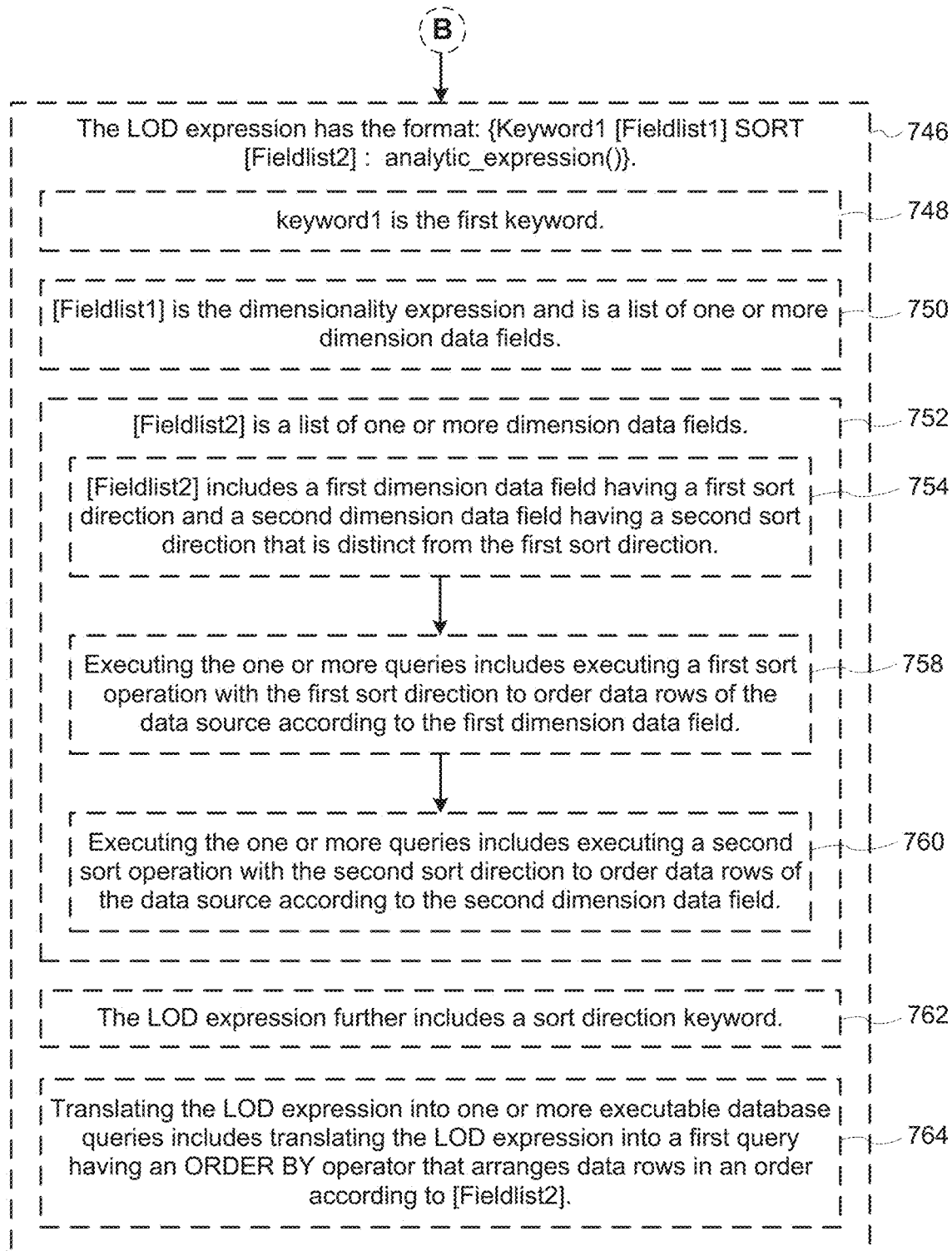
Figure 7E:
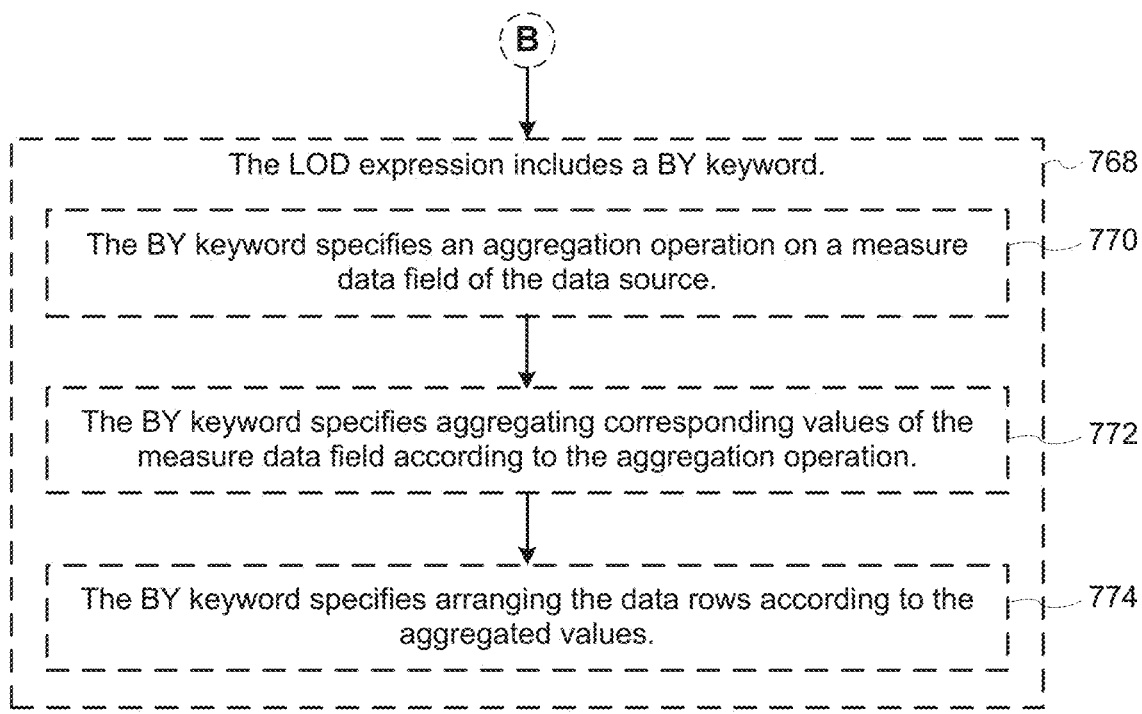

FIGS. 7C-7E below point out some of the features of LOD expressions, according to some implementations.

In response to (718) the user input, the computing device 200 identifies (720) one or more data fields from the data source.

In some implementations, identifying the one or more data fields includes identifying (722) a first dimension data field as a partitioning field by which the data rows are partitioned. For example, in some implementations, the computing device 200 identifies the first dimension data field as a partitioning field in accordance with user specification (e.g., user input or a user command) of the first data field as a partitioning field.

In some implementations, the identified data fields include (732) an ordering field corresponding to the SORT keyword. In some instances, the ordering field is (734) a dimension data field. For example, as explained in FIG. 5P, while the ORDER BY in SQL can be a measure or a dimension, the LOD expression requires that the SORT data field is a dimension and the BY data field is a measure.

The computing device 200 translates (724) (e.g., compiles) the LOD expression into one or more executable database queries (e.g., VizQL queries or commands) referencing the identified data fields.

The computing device 200 executes (726) the one or more queries to retrieve data from the data source. In some implementations, executing the one or more queries includes executing (736) a sort operation to order data rows of the data source (e.g., in an ascending order, a descending order, or an alphabetical order) according to the ordering field. In some implementations, an alternative keyword (e.g., instead of the "SORT" keyword) is used to specify the same concept.

When there is an LOD expression with an analytic function, each database query partitions the data rows into non-overlapping subsets. In some instances there is a single subset, but more often there is more than one subset. For each subset, executing the one or more queries includes (742) computing values over the subset of data rows. Unlike aggregation, which computes a single aggregated value for the subset, an analytic function returns (744) a respective single result for each data row in the subset (see the running sum examples in FIGS. 5A-5Q).

The computing device 200 then generates (728) and displays a data visualization using the retrieved data. In some implementations, the data visualization is displayed (730) in a graphical user interface of the computing device 200.

In some implementations, the LOD expression has (746) the format {Keyword1[Fieldlist1] SORT [Fieldlist2] : analytic_expression()}. See, e.g., FIG. 5J. keyword1 is (748) the first keyword. [Fieldlist1] is (750) the dimensionality expression and comprises a list of one or more dimension data fields. [Fieldlist2] is (752) a list of one or more dimension data fields (e.g., ordering fields).

In some implementations, [Fieldlist2] includes (754) a first dimension data field with a first sort direction (e.g., ascending, descending, or alphabetical). [Fieldlist2] includes (754) a second dimension data field having a second sort direction (e.g., ascending, descending, or alphabetical) that is distinct from the first sort direction. In some implementations, executing (756) the one or more queries includes (758) executing a first sort operation with the first sort direction to order data rows of the data source according to the first dimension data field. In some implementations, executing the one or more queries also includes (760) executing a second sort operation with the second sort direction to order data rows of the data source according to the second dimension data field.

In some implementations, [Fieldlist2] includes at least two elements (e.g., at least two dimension data fields). The LOD expression enables a user to specify a respective order for each individual element of [Fieldlist2].

In some implementations, the LOD expression further includes (762) a sort direction keyword. For example, the LOD expression has a format comprising {INCLUDE [Fieldlist1] SORT [FieldlistA] asc, [FieldlistB] desc : RANK()}, where "asc" (e.g., ascending) if the sort direction keyword. In this example, [FieldlistA] and [FieldlistB] are both members of the SORT list, but have separate sort directions.

In some implementations, translating the LOD expression into one or more executable database queries includes translating (764) the LOD expression into a first query having an ORDER BY operator that arranges data rows in an order (e.g., ascending order, descending order, or alphabetical order) according to [Fieldlist2].

In some implementations, the LOD expression has (776) the format {Keyword1[Fieldlist1] SORT [Fieldlist2] BY AGG(Field3) : analytic_expression()}. keyword1 is (778) the first keyword. [Fieldlist1] is (780) the dimensionality expression and comprises a list of one or more ordering data fields (e.g., dimension data fields). [Fieldlist2] is (782) a list of one or more dimension data fields. (Field 3) is (784) the measure data field, and AGG is (786) an aggregation operator corresponding to the aggregation operation. In some implementations, the aggregation operator is (788) SUM, AVG, COUNT, COUNTD, MIN, or MAX.

In some implementations, the LOD expression further includes (790) a sort direction keyword following (Field 3). In some implementations, (Field3) is (792) a single measure data field.

In some implementations, translating the LOD expression into one or more executable database queries includes translating (794) the LOD expression into a second query that includes an ORDER BY operator, which arranges data rows in an order according to the measure data field and a GROUP BY operator that partitions the data rows according to the list of ordering data fields. For example, if the BY keyword is present, the measure following the BY keyword translates to an SQL ORDER BY clause, and the SORT dimensions are added to a GROUP BY clause.

In some implementations, the LOD expression includes (768) a BY keyword. The BY keyword specifies (770) an aggregation operation on a measure data field of the data source, specifies (772) aggregating corresponding values of the measure data field according to the aggregation operation, and specifies (774) arranging the data rows according to the aggregated values. As explained in FIG. 5P, while the ORDER BY in SQL can be a measure or a dimension, the LOD syntax requires that SORT uses a dimension and BY uses a measure.

Each of the above identified executable modules, applications, or sets of procedures may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 206 stores a subset of the modules and data structures identified above. Furthermore, the memory 206 may store additional modules or data structures not described above.

The terminology used in the description of the invention herein is for the purpose of describing particular implementations only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method, comprising:
   at a computing device including a display, one or more processors, and memory storing one or more programs configured for execution by the one or more processors:
   receiving user selection of a data source;
   receiving a user input to specify a level of detail (LOD) expression that includes a first keyword, a SORT keyword, and an analytic expression, wherein:
      the first keyword specifies how a dimensionality expression corresponding to the first keyword is used in the LOD expression; and
      the analytic expression includes an analytic function that partitions data rows from the data source into groups and computes a respective distinct value for each data row in a respective group using values from other data rows in the respective group;
   in response to the user input:
      identifying one or more data fields from the data source;
      translating the LOD expression into one or more executable database queries referencing the identified data fields;
      executing the one or more queries to retrieve data from the data source; and
      generating and displaying a data visualization using the retrieved data.

2. The method of claim 1, wherein the first keyword is selected from the group consisting of: FIXED, INCLUDE, and EXCLUDE.

3. The method of claim 1, wherein the analytic function is selected from the group consisting of: RUNNING_SUM, RUNNING_AVERAGE, RUNNING_COUNT, RUNNING_MAX, RUNNING_MIN, RANK, RANK_DENSE, RANK_MODIFIED, RANK_PERCENTILE, RANK_UNIQUE, and LOOKUP.

4. The method of claim 1, wherein:
   the identified data fields include an ordering field corresponding to the SORT keyword; and
   executing the one or more queries includes executing a sort operation to order data rows of the data source according to the ordering field.

5. The method of claim 4, wherein the ordering field is a dimension data field.

6. The method of claim 1, wherein:
   the data source comprises a data table that has a plurality of data rows; and
   executing the one or more queries includes:
      computing values over a subset of the data rows; and
      returning a respective single result for each data row in the subset.

7. The method of claim 1, wherein:
   the LOD expression has a format comprising {Keyword1 [Fieldlist1] SORT [Fieldlist2] : analytic_expression()};
   keyword1 is the first keyword;
   [Fieldlist1] is the dimensionality expression and comprises a list of one or more dimension data fields; and
   [Fieldlist2] is a list of one or more dimension data fields.

8. The method of claim 7, wherein:
   [Fieldlist2] includes a first dimension data field having a first sort direction and a second dimension data field having a second sort direction that is distinct from the first sort direction; and
   executing the one or more queries includes:
      executing a first sort operation with the first sort direction to order data rows of the data source according to the first dimension data field; and
      executing a second sort operation with the second sort direction to order data rows of the data source according to the second dimension data field.

9. The method of claim 7, wherein the LOD expression further includes a sort direction keyword.

10. The method of claim 7, wherein translating the LOD expression into one or more executable database queries includes translating the LOD expression into a first query having an ORDER BY operator that arranges data rows in an order according to [Fieldlist2].

11. The method of claim 1, wherein:
    the data source comprises a data table that has a plurality of data rows; and
    the LOD expression further includes a BY keyword that:
       specifies an aggregation operation on a measure data field of the data source;
       aggregates corresponding values of the measure data field according to the aggregation operation; and
       arranges the data rows according to the aggregated values.

12. The method of claim 11, wherein:
the LOD expression has a format comprising {Keyword1 [Fieldlist1] SORT [Fieldlist2] BY AGG(Field3) : analytic_expression()};
keyword1 is the first keyword;
[Fieldlist1] is the dimensionality expression and comprises a list of one or more ordering data fields;
[Fieldlist2] is a list of one or more dimension data fields;
(Field 3) is the measure data field; and
AGG is an aggregation operator corresponding to the aggregation operation.

13. The method of claim 12, wherein the LOD expression further includes a sort direction keyword following (Field 3).

14. The method of claim 12, wherein (Field3) is a single measure data field.

15. The method of claim 12, wherein translating the LOD expression into one or more executable database queries includes translating the LOD expression into a second query that includes an ORDER BY operator that arranges data rows in an order according to the measure data field and a GROUP BY operator that partitions the data rows according to the list of ordering data fields.

16. The method of claim 12, wherein the aggregation operator is selected from the group consisting of: SUM, AVG, COUNT, COUNTD, MIN, and MAX.

17. The method of claim 1, wherein identifying the one or more data fields includes identifying a first dimension data field as a partitioning field by which the data rows are partitioned.

18. The method of claim 1, wherein the data visualization is displayed in a graphical user interface of the computing device.

19. A computing device, comprising:
a display;
one or more processors; and
memory coupled to the one or more processors, the memory storing one or more programs configured to be executed by the one or more processors, the one or more programs including instructions for:
  receiving user selection of a data source;
  receiving a user input to specify a level of detail (LOD) expression that includes a first keyword, a SORT keyword, and an analytic expression, wherein:
    the first keyword specifies how a dimensionality expression corresponding to the first keyword is used in the LOD expression; and
    the analytic expression includes an analytic function that partitions data rows from the data source into groups and computes a respective distinct value for each data row in a respective group using values from other data rows in the respective group;
  in response to the user input:
    identifying one or more data fields from the data source;
    translating the LOD expression into one or more executable database queries referencing the identified data fields;
    executing the one or more queries to retrieve data from the data source; and
    generating and displaying a data visualization using the retrieved data.

20. A non-transitory computer-readable storage medium storing one or more programs, the one or more programs comprising instructions, which when executed by a computing device, cause the computing device to perform operations comprising:
receiving user selection of a data source;
receiving a user input to specify a level of detail (LOD) expression that includes a first keyword, a SORT keyword, and an analytic expression, wherein:
  the first keyword specifies how a dimensionality expression corresponding to the first keyword is used in the LOD expression; and
  the analytic expression includes an analytic function that partitions data rows from the data source into groups and computes a respective distinct value for each data row in a respective group using values from other data rows in the respective group;
in response to the user input:
  identifying one or more data fields from the data source;
  translating the LOD expression into one or more executable database queries referencing the identified data fields;
  executing the one or more queries to retrieve data from the data source; and
  generating and displaying a data visualization using the retrieved data.

* * * * *